United States Patent
Ward et al.

(10) Patent No.: US 9,942,691 B2
(45) Date of Patent: Apr. 10, 2018

(54) SYSTEM CONFIGURATIONS TO DETERMINE USER DATA ASSOCIATED WITH MOBILE APPLICATIONS

(71) Applicant: PAYPAL, INC., San Jose, CA (US)

(72) Inventors: Kevin Ward, Campbell, CA (US); Vijeyta Aggarwal, Los Altos, CA (US); Michael Charles Todasco, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/192,074

(22) Filed: Jun. 24, 2016

(65) Prior Publication Data

US 2017/0374488 A1    Dec. 28, 2017

(51) Int. Cl.
| | |
|---|---|
| H04W 4/00 | (2009.01) |
| H04M 1/72 | (2006.01) |
| H04M 1/725 | (2006.01) |
| H04L 29/08 | (2006.01) |
| H04W 4/02 | (2018.01) |
| H04W 68/00 | (2009.01) |

(52) U.S. Cl.
CPC .......... *H04W 4/003* (2013.01); *H04L 67/306* (2013.01); *H04M 1/72583* (2013.01); *H04W 4/02* (2013.01); *H04W 68/005* (2013.01)

(58) Field of Classification Search
CPC . H04M 1/72525; H04M 3/42178; G06F 8/61; G06F 8/60; G06F 8/63
USPC ................................................ 455/418–420
See application file for complete search history.

(56) References Cited

U.S. PATENT DOCUMENTS

| | | | | |
|---|---|---|---|---|
| 7,409,208 B1* | 8/2008 | Clare | ........................ | G06F 8/61 455/419 |
| 7,542,759 B2* | 6/2009 | Edwards | ................... | G06F 8/65 370/337 |
| 7,716,662 B2* | 5/2010 | Seiden | ....................... | G06F 8/61 717/173 |
| 7,734,285 B2* | 6/2010 | Chmaytelli | ............... | G06F 8/62 455/418 |
| 8,887,155 B2* | 11/2014 | Gokul | ..................... | G06Q 30/02 455/414.1 |
| 2004/0185874 A1* | 9/2004 | Kim | ......................... | H04L 12/66 455/456.3 |
| 2009/0217256 A1* | 8/2009 | Kim | ..................... | G06F 11/1433 717/168 |
| 2010/0159909 A1* | 6/2010 | Stifelman | ......... | H04M 1/27455 455/418 |
| 2012/0246630 A1* | 9/2012 | Kuzins | ...................... | G06F 8/61 717/169 |
| 2013/0103804 A1* | 4/2013 | Byrnes | .................... | H04L 29/04 709/218 |

(Continued)

*Primary Examiner* — Sharad Rampuria
(74) *Attorney, Agent, or Firm* — Haynes and Boone, LLP

(57) ABSTRACT

Various systems, mediums, and methods may determine one or more configurations associated with a provider application. For example, a mobile system may determine a request to install a provider application, possibly based on one or more user inputs received by the mobile system. The mobile system may determine other applications installed on the mobile system. The mobile system may determine one or more configurations of the provider application based on the other applications installed. As such, the mobile system may install the provider application to the mobile system based on the one or more configurations determined.

19 Claims, 15 Drawing Sheets

(56) References Cited

U.S. PATENT DOCUMENTS

| | | | |
|---|---|---|---|
| 2014/0052683 A1* | 2/2014 | Kirkham | G06Q 30/0631 |
| | | | 706/46 |
| 2014/0089913 A1* | 3/2014 | Aaronson | G06F 8/62 |
| | | | 717/174 |
| 2015/0065170 A1* | 3/2015 | Brisebois | H04W 4/003 |
| | | | 455/456.3 |
| 2015/0074656 A1* | 3/2015 | Eramian | G06F 9/44505 |
| | | | 717/168 |
| 2016/0062635 A1* | 3/2016 | Feit | G06F 3/04883 |
| | | | 715/765 |

* cited by examiner

SYSTEM CONFIGURATIONS TO DETERMINE USER DATA ASSOCIATED WITH MOBILE APPLICATIONS

BACKGROUND

Mobile applications or "apps" are becoming increasingly more prevalent in the modern world. It is not uncommon for a single user to have multiple mobile apps installed on their personal computing device. Yet, computing devices may differ or range in the number of mobile apps installed. For example, consider a scenario where a first user has a few mobile apps on her computing device, whereas a second user has numerous mobile apps on her computing device. As such, the mobile apps on the first user's device may reflect the first user's interests, possibly related to a few of her activities. Yet, the mobile apps on the second user's device may reflect the second user's interests, possibly related to several of her activities throughout her daily life. As such, individual users may download specific apps based on their interest at a given time and/or possibly based on the content or functionality associated with an app. After the app is downloaded, the user may use different apps, each with a unique frequency, again indicating a current interest in the content or functionality of the app.

Figure 1:
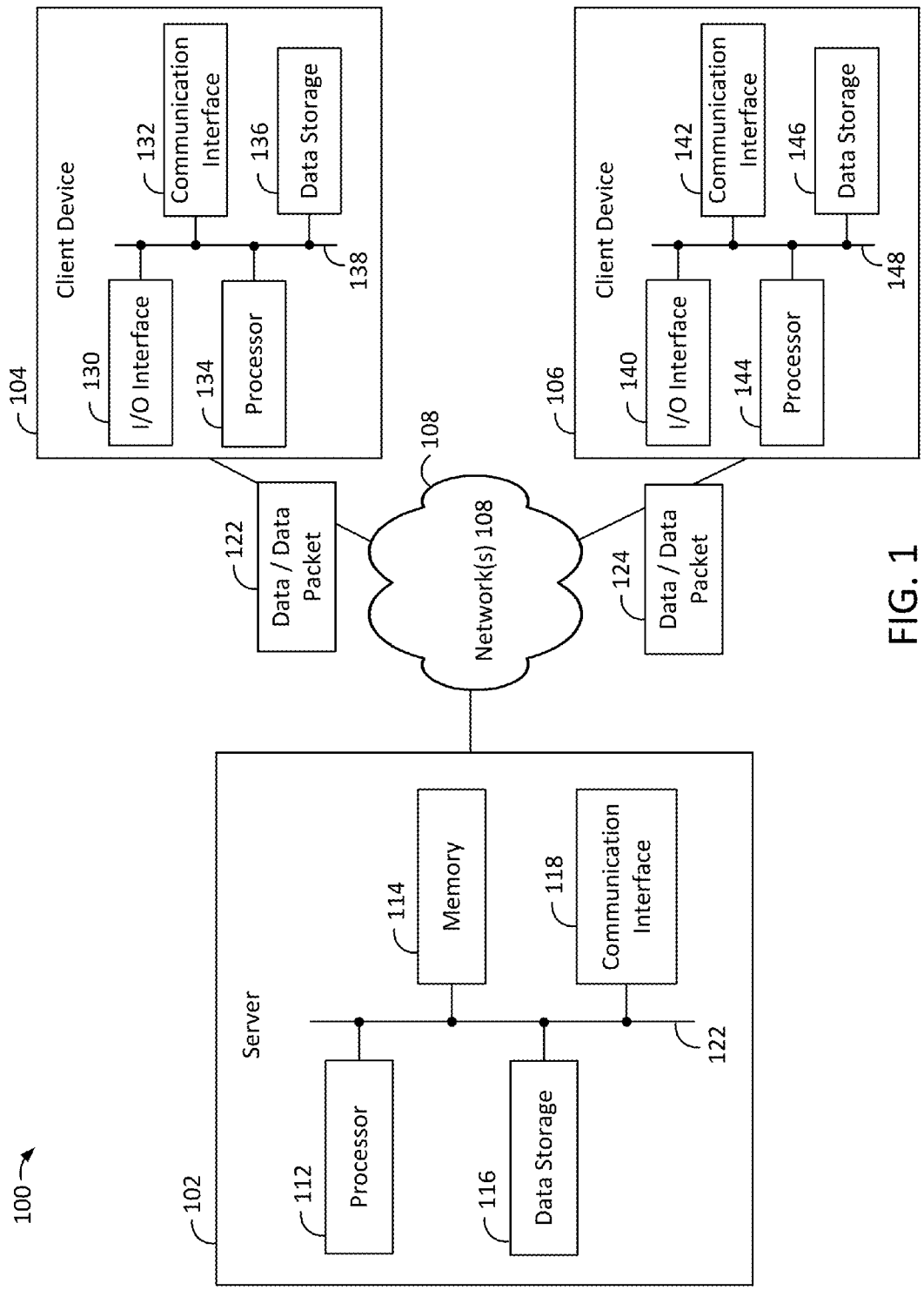
FIG. 1 is a block diagram of an exemplary system, according to an embodiment.

Embodiments of the present disclosure and their advantages may be understood by referring to the detailed description herein. It should be appreciated that reference numerals may be used to illustrate various elements and features provided in the figures. The figures may illustrate various examples for purposes of illustration and explanation related to the embodiments of the present disclosure and not for purposes of any limitation.

DETAILED DESCRIPTION

In another scenario, consider the first user above is an elderly user and the second user above is a younger user. Further, consider that the elderly user and the younger user both install a given mobile app on their respective computing devices. In such instances, the elderly user may have difficulty viewing and reading content provided by the mobile app, whereas the younger user may not have such challenges. In some instances, the younger user may find the content provided by the mobile app less intuitive compared to the other mobile apps on the younger user's device. As such, the mobile app may not be suitable for the elderly user and in some instances, the mobile app may not be configured to the younger user's preferences.

As demonstrated above, there is much need for advancements in technology and technical fields involving mobile applications and computing devices. Particularly, there is much need for improving the functioning of computing devices with various types of applications for different users.

As described above, there is much need for advancements in technology and technical fields involving mobile applications and computing devices. In particular, there is a need for improving the functioning of computing devices with various types of applications for different users. The type, number, placement, and usage of apps are typically unique to a user, such that this information can be used in new ways to improve both the user experience and app provider effectiveness, such as, but not limited to, onboarding or logging in a user with a specific app and more generally to presenting specific content in a specific way that may vary from user to user based on the information obtained from apps on the user device.

For example, based on the scenarios described above, the elderly user may have to change the settings of the computing device and/or the mobile application to enlarge the font in the content provided by the mobile application such that the elderly user can better view and/or read the content. Further, the younger user may also have to change the settings of the mobile application installed. For example, the younger user may wish to enable fingerprint sensor capabilities with the mobile application, possibly to make the login with the mobile application a more seamless process, among other changes to better suit the activities of the younger user. As such, specific data may be associated with particular mobile applications.

In some embodiments, the provider application described herein may be a mobile app that addresses the need for the advancements described above to improve the functioning of mobile apps and computing devices. In some instances, the provider application may be configured to perform a number of data transfers for a user account with a given provider, such as PayPal, Inc. of San Jose, Calif., USA. In some instances, the computing device may install the provider application based on one or more configurations, such as a user profile and/or profile configurations. In some instances, the one or more configurations may correspond to transferring funds and/or making transactions with the provider application. As such, the one or more configurations may manage, track, and/or modify a user's account associated the provider application. Yet further, the configurations of the provider application may include various settings, such as privacy settings, settings associated with accessibility to personal information of the user's account, login and security settings, settings for fingerprint identification potentially to login with the provider application, settings to add/remove funding instruments to/from the provider application, settings to link the user's uniform resource locator (URL) address to the provider application, notification settings, and agreement and/or policy settings, among other possibilities. In some instances, the user profile, the profile configurations, and/or the configurations of the provider application may be described interchangeably herein. As such, the computing device may be able to determine and/or predict user inputs, such that the computing device may facilitate the predicted user inputs with various contents displayed by the computing device. Notably, the provider application may be referred to as a provider app, a mobile provider app, and/or the PayPal app, among various related references.

For example, considering the scenarios above, various configurations of the provider application may be determined for the elderly user. In particular, the provider application may communicate with the operating system of the elderly user's computing device to determine the other applications installed on the computing device. For instance, the elderly user's computing device may have a medical application installed, such as a blood pressure application, possibly configured to track and analyze the elderly user's blood pressure measurements over one or more periods of time. Further, the computing device may have a medication reminder application configured to remind the elderly person which medication to take and what time(s) to take the medication. As such, the computing device may determine one or more configurations of the provider application for the elderly user to visit a medical practitioner associated with co-pays, take blood pressure and other vitals measurements, purchase prescription medication from one or more drug stores, among other possible configurations potentially associated with the provider application and/or the elderly user.

Further, various configurations of the provider application may be determined for the younger user, possibly determined by the younger user's computing device. In particular, the provider application may also communicate with the operating system of the younger user's computing device to determine the other applications installed on the computing device. For example, the computing device may have a taxi application configured to communicate with a number of taxi drivers, an airline application configured to check-in to flights and determine flight statuses, and/or a food ordering application installed, among a number of other applications possibly installed on the computing device. Thus, the computing device may determine and/or predict user inputs with the provider application for the younger user to request a taxi driver to pick her up at a location, travel with one or more airlines, and/or order food from one or more restaurants, among other possible inputs potentially associated with the provider application and/or the younger user.

Notably, the computing device may determine the configurations of the provider application based on various types of applications identified on the user's computing device. For example, the computing device may determine the configurations of the provider application based on identifying savings applications, gaming applications, location-based applications, music downloading and/or streaming applications, image capturing and/or editing applications, and/or social networking applications, among various other types of applications. Notably, determining the configurations of the provider application may involve determining and/or predicting one or more user inputs. For example, the computing device may predict user inputs, such as user inputs with a mobile application, possibly the mobile application being installed on the computing device. As such, the mobile application may be installed with one or more configurations based on the predicted user inputs.

Further, the provider application of a computing device may determine the configurations of the provider application based on various types of data retrieved from the other apps installed on the computing device. For example, the computing device may determine the configurations of the provider application based on various types of content accessed by the other apps. Further, the computing device may determine the configurations of the provider application based on how frequently the other apps are accessed, activated, used, and/or whether certain apps have been deleted. In some instances, the computing device may determine the configurations of the provider application based on how recently each of the other apps were installed. The computing device may also determine the configurations of the provider application based on usages tracked for each of the other apps within certain time periods (e.g., within the past week, within the past year, etc.), possibly also referred to as a usage history determined for each of the other apps. Further, in some instances, the computing device may determine the configurations of the provider application based on the positions of the other apps, possibly based on the app positions being on a first home screen of the computing device as opposed to a second home screen of the computing device. Yet further, the computing device may determine the configurations of the provider application based on the updates to the other apps, notifications from the other apps, and/or competing apps to the apps installed, among various other user characteristics associated with the other apps.

In some embodiments, the computing device may determine the configurations of the provider application based on identifying various other aspects of the user's computing device. For example, the computing device may determine the configurations of the provider application based on identifying key words typed and/or searched by the user, messages sent and/or received by the user, and/or various other inputs associated with the computing device. For example, the computing device may determine the configurations of the provider application based on text messages sent and/or received with the computing device, digital photos and/or images captured by the computing device, locations of the digital photos and/or images determined, among other possible aspects of the user's computing device. Notably, the computing device may also determine the configurations of the provider application based on the settings of the computing device and/or the other apps installed on the computing device, possibly related to enabling or disabling location-based services, push notifications, and/or ring tones, among other possibilities.

In some embodiments, the computing device may determine the configurations of the provider application for an onboarding process, possibly based on an installation process for the provider application on the user's computing device. In such instances, the onboarding process may be customized for the user based on the configurations of the provider application identified, thereby providing a unique onboarding experience for the user. As such, the improvements to the computing device may enable the user to install the provider application and/or open an account with the provider more seamlessly. For example, considering the scenarios above, the provider application may configure an onboarding process for the elderly user such that content is provided to the elderly person with larger fonts. Further, consider that the younger user has a Spanish television application on the younger user's computing device. As such, the provider application may configure an onboarding process for the younger user such that content is provided to the younger user in Spanish, among various other possibilities. Thus, customized content may be provided on a display of the user device that varies from user to user and provides a more optimized experience for the user, including the user not having to make adjustments to the display and/or launch multiple screens through the app provider.

FIG. 1 is a simplified block diagram of an exemplary system 100, according to an embodiment. As shown, the system 100 may include a server 102. The server 102 may be configured to perform operations of a provider, such as PayPal, Inc. of San Jose, Calif., USA. Further, the system 100 may also include client device 104 and the client device 106. As such, the server 102 and the client devices 104 and 106 may be configured to communicate over the one or more communication networks 108. As shown, the system 100 includes multiple computing devices 102, 104, and/or 106.

The system 100 may operate with more or less than the computing devices 102, 104, and/or 106 shown in FIG. 1, where each device may be configured to communicate over the one or more communication networks 108, possibly to transfer data from one device to another. The one or more communication networks 108 may include a packet-switched network configured to provide digital networking communications and/or exchange data of various forms, contents, types, and/or structures. In some instances, the one or more communication networks 108 may include a data network, a private network, a local area network, a wide area network, a telecommunications network, and/or a cellular network, among other possible networks. In some instances, the communication network 108 may include network nodes, web servers, base stations, microcells, switches, routers, and/or various buffers/queues to transfer data/data packets 122 and/or 124.

The data/data packets 122 and/or 124 may include various forms of data associated with the user accounts described herein. The data/data packets 122 and/or 124 may be transferrable using communication protocols such as packet layer protocols, packet ensemble layer protocols, and/or network layer protocols, among other types of communication protocols. For example, the data/data packets 122 and/or 124 may be transferrable using transmission control protocols and/or internet protocols (TCP/IP). In various embodiments, each of the data/data packets 122 and 124 may be assembled or disassembled into larger or smaller packets of varying capacities, such as capacities varying from 1,000 to 1,100 bytes, for example, among other possible data capacities. As such, data/data packets 122 and/or 124 may be transferrable over the one or more networks 108 and to various locations in the one or more networks 108.

In some embodiments, the server 102 may take a variety of forms. The server 102 may be an enterprise server, possibly operable with one or more operating systems to facilitate the scalability of the architecture within the system 100. For example, the server 102 may operate with a Unix-based operating system configured to integrate with a growing number of other servers in the one or more networks 108, the client devices 104 and/or 106, among other computing devices configured to communicate with the system 100. The server 102 may further facilitate workloads for performing numerous data transfers with the client devices 104 and/or 106. In particular, the server 102 may facilitate the scalability relative to increasing number of data transfers to eliminate data congestion, bottlenecks, and/or transfer delays.

In some embodiments, the server 102 may include multiple components, such as one or more hardware processors 112, non-transitory memories 114, non-transitory data storages 116, and/or communication interfaces 118, among other possible components described in relation to FIG. 1, any of which may be communicatively linked via a system bus, network, or other connection mechanism 122. The one or more hardware processors 112 may take the form of a multi-purpose processor, a microprocessor, a special purpose processor, a digital signal processor (DSP) and/or other types of processing components. For example, the one or more hardware processors 112 may include an application specific integrated circuit (ASIC), a programmable system-on-chip (SOC), and/or a field-programmable gate array (FPGA). In particular, the one or more hardware processors 112 may include a variable-bit (e.g., 64-bit) processor architecture configured to transfer the data packets 122 and/or 124. As such, the one or more hardware processors 112 may execute varying instructions sets (e.g., simplified and complex instructions sets) with fewer cycles per instruction than other general-purpose hardware processors, thereby improving the performance of the server 102.

In practice, for example, the one or more hardware processors 112 may be configured to read instructions from the non-transitory memory component 114 to cause the system 100 to perform operations. For example, the system 100 may determine a request to install a provider application to the client device 104, possibly taking the form of a mobile device, such as a smartphone device. The request to install the provider application may be determined based on one or more user inputs received by the client device 104. The system 100 may also determine a number of other applications installed on the client device 104. The system 100 may also determine one or more configurations of the provider application based on the number of other applications installed on the client device 104. The system 100 may install the provider application to the client device 100 based on the one or more configurations of the provider application determined.

The non-transitory memory component 114 and/or the non-transitory data storage 116 may include one or more volatile, non-volatile, and/or replaceable storage components, such as magnetic, optical, and/or flash storage that may be integrated in whole or in part with the one or more hardware processors 112. Further, the memory component 114 may include or take the form of a non-transitory computer-readable storage medium, having stored thereon computer-readable instructions that, when executed by the hardware processing component 112, cause the server 102 to perform operations described in this disclosure, illustrated by the accompanying figures, and/or otherwise contemplated herein.

The communication interface component 118 may take a variety of forms and may be configured to allow the server 102 to communicate with one or more devices, such as the client devices 104 and/or 106. For example, the communication interface 118 may include a transceiver that enables the server 102 to communicate with the client devices 104 and/or 106 over the one or more communication networks 108. In some instances, the communication interface 118 may include a wired interface, such as an Ethernet interface, to communicate with the client devices 104 and/or 106. Further, in some instances, the communication interface 118 may include a cellular interface, such as a Global System for Mobile Communications (GSM) interface, a Code Division Multiple Access (CDMA) interface, and/or a Time Division Multiple Access (TDMA) interface. Yet further, in some instances, the communication interface 118 may include a wireless local area network interface such as a WI-FI interface configured to communicate with a number of different protocols. As such, the communication interface 118 may include a wireless interface operable to transfer data over short distances utilizing short-wavelength radio waves in approximately the 2.4 to 2.485 GHz range. In some instances, the communication interface 118 may send/receive data or data packets 122 and/or 124 to/from client devices 104 and/or 106.

The client devices 104 and 106 may also be configured to perform a variety of operations such as those described in this disclosure, illustrated by the accompanying figures, and/or otherwise contemplated herein. In particular, the client devices 104 and 106 may be configured to transfer data packets 122 and/or 124 associated with respective user accounts to and from the server 102. The data packets 122 and/or 124 may include mobile application data possibly to install one or more mobile application, user intent data, data associated with configurations of the provider applications, device configuration data, content and/or related data, image data, inquiry data, and/or response data, among other types of data. Further, the data packets 122 and/or 124 may also include location data such as Global Positioning System (GPS) data or GPS coordinate data, triangulation data, beacon data, WI-FI data, sensor data, movement data, and/or temperature data, among other types of data.

In some embodiments, the client devices 104 and 106 may include or take the form of a smartphone system, a personal computer (PC) such as a laptop device, a tablet computer device, a point-of-sale (POS) device, a card reader device, a wearable computer device, a head-mountable display (HMD) device, a smart watch device, and/or other types of computing devices configured to transfer data associated with a user account. The client devices 104 and 106 may include various components, including, for example, input/output (I/O) interfaces 130 and 140, communication interfaces 132 and 142, hardware processors 134 and 144, and non-transitory data storages 136 and 146, respectively, all of which may be communicatively linked with each other via a system bus, network, or other connection mechanisms 138 and 148, respectively.

The I/O interfaces 130 and 140 may be configured to receive inputs from and provide outputs to users of the client devices 104 and 106. For example, the I/O interface 130 may include a graphical user interface (GUI) configured to receive a user input that activates the provider application with the other applications. Thus, the I/O interfaces 130 and 140 may include displays and/or input hardware with tangible surfaces such as touchscreens with touch sensors and/or proximity sensors configured with variable sensitivities to detect the user touches and touch inputs. The I/O interfaces 130 and 140 may also be synched with a microphone, sound speakers, and/or other audio mechanisms configured to receive voice commands. Further, the I/O interfaces 130 and 140 may also include a computer mouse, a keyboard, and/or other interface mechanisms. In addition, I/O interfaces 130 and 140 may include output hardware, such as one or more touchscreen displays, haptic feedback systems, and/or other hardware components.

In some embodiments, communication interfaces 132 and 142 may take a variety of forms. For example, communication interfaces 132 and 142 may be configured to allow client devices 104 and 106, respectively, to communicate with one or more other devices according to a number of protocols described or contemplated herein. For instance, communication interfaces 132 and 142 may be configured to allow client devices 104 and 106, respectively, to communicate with the server 102 over the one or more communication networks 108. The processors 134 and 144 may include one or more multi-purpose processors, microprocessors, special purpose processors, digital signal processors (DSP), application specific integrated circuits (ASIC), programmable system-on-chips (SOC), field-programmable gate arrays (FPGA), and/or other types of processing components described or contemplated herein.

The data storages 136 and 146 may include one or more volatile, non-volatile, removable, and/or non-removable storage components, and may be integrated in whole or in part with processors 134 and 144, respectively. Further, data storages 136 and 146 may include or take the form of non-transitory computer-readable mediums, having stored thereon instructions that, when executed by processors 134 and 144, cause the client devices 104 and 106 to perform operations, respectively, such as those described in this disclosure, illustrated by the accompanying figures, and/or otherwise contemplated herein.

In some embodiments, a provider application may be installed on the client device 104. The provider application may give the user of the client device 104 access to the user's account with a provider, such as PayPal, Inc. of San Jose, Calif., USA. Further, the user may transfer funds from the user account with the client device 104. In particular, the client device 104 may be used to generate and/or transfer the data packet 122 to request a connection with the server 102. As such, the data packet 122 may initiate a search of an internet protocol (IP) address of the server 102 that may take the form of the IP address, "192.168.1.102," for example. In some instances, an intermediate server, e.g., a domain name server (DNS) and/or a web server, possibly in the one or more networks 108 may identify the IP address of the server 102 to establish the connection between the client device 104 and the server 102. As such, the server 102 may complete the transfer of funds, possibly based on the data packet 122 retrieved.

It can be appreciated that the server 102 and the client devices 104 and/or 106 may be deployed in various other ways. For example, the operations performed by the server 102 and/or the client devices 104 and 106 may be performed by a greater or a fewer number of devices. Further, the operations performed by two or more of the devices 102, 104, and/or 106 may be combined and performed by a single device. Yet further, the operations performed by a single device may be separated or distributed among the server 102 and the client devices 104 and/or 106. In addition, the client devices 104 and/or 106 may be operated and/or maintained by different users such that each client device 104 and/or 106 may be associated with respective user accounts.

Notably, a user account associated with a provider may be displayed on the client device 104, possibly with the I/O interface 130. For example, a provider application of the client device 104 may be configured to access the user account displayed on the I/O interface 130. As noted, the user account may be a personal account with the user's funds. Further, the user account may be a corporate account, such that employees, staff, worker personnel, and/or contractors, among other individuals may have access to the corporate account. Further, an account may be a family account created for multiple family members, where each member may have access to the account. Yet further, it should be noted that a user may be a number of individuals, a group, and/or possibly a robotic device or system, among other computing devices capable of transferring data associated with the user account. In some instances, data may be required to access the user account and/or perform a transfer with the account. For example, the data required may include user identifier data, such as login data, an email address, a username, a password, a phone number, a security code, an encryption key, authentication data, biometric data (e.g., fingerprint data), and/or other types of data to access the user account and/or perform a transfer with the account.

Figure 2A:
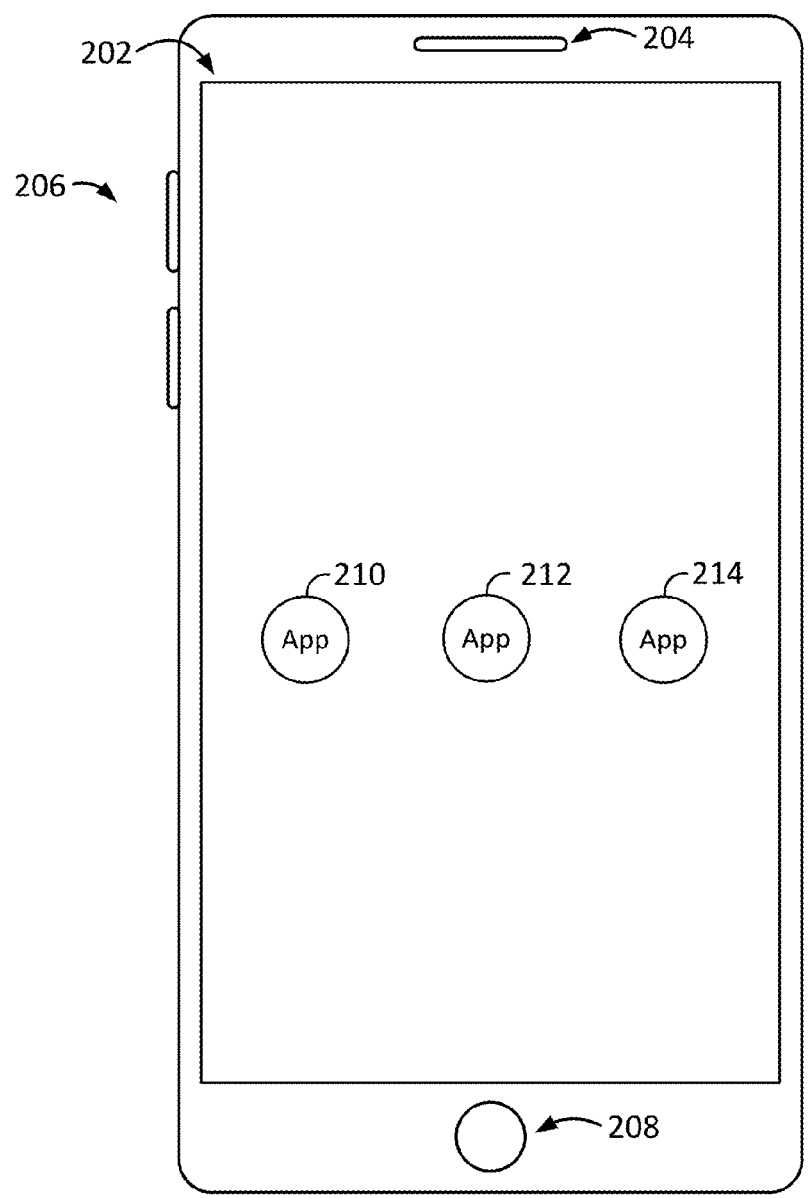
FIG. 2A illustrates an exemplary mobile system with a number of applications, according to an embodiment.

FIG. 2A illustrates an exemplary mobile system 200 with a number of applications 210, 212, and 214, according to an embodiment. As shown, the mobile system 200 may take the form of a computing device, such as the client device 104 described above in relation to FIG. 1. As such, the mobile system 200 may include the I/O interface 202, possibly where the I/O interface 202 takes the form of the I/O interface 130 described above. In particular, the I/O interface 202 may include a touch-sense interface configured to detect one or more touch inputs from a user. Further, as shown, the mobile system 200 may include a speaker 204, one or more buttons 206, and/or a button 208. The button 208 may include a fingerprint sensor configured to detect and/or identify one or more fingerprints of the user, potentially to authenticate a transfer of funds from the user's account to another account, such as a merchant account.

As illustrated, the mobile system 200 may include a number of applications 210, 212, and/or 214. For example, consider the elderly user described above such that the mobile system 200 is the elderly user's mobile device. As such, the application 210 may be the blood pressure application, the application 212 may be the medication reminder application, and the application 214 may be a drug store application for purchasing medication from one or more drug stores. Yet, consider another example with the younger user described above such that the mobile system 200 is the younger user's mobile device. As such, the application 210 may be the taxi application, the application 212 may be the airline application, and the application 214 may be the food ordering application. As such, the mobile applications 210, 212, and/or 214 may reflect activities and/or interests of a given user of the mobile system 200.

Figure 2B:
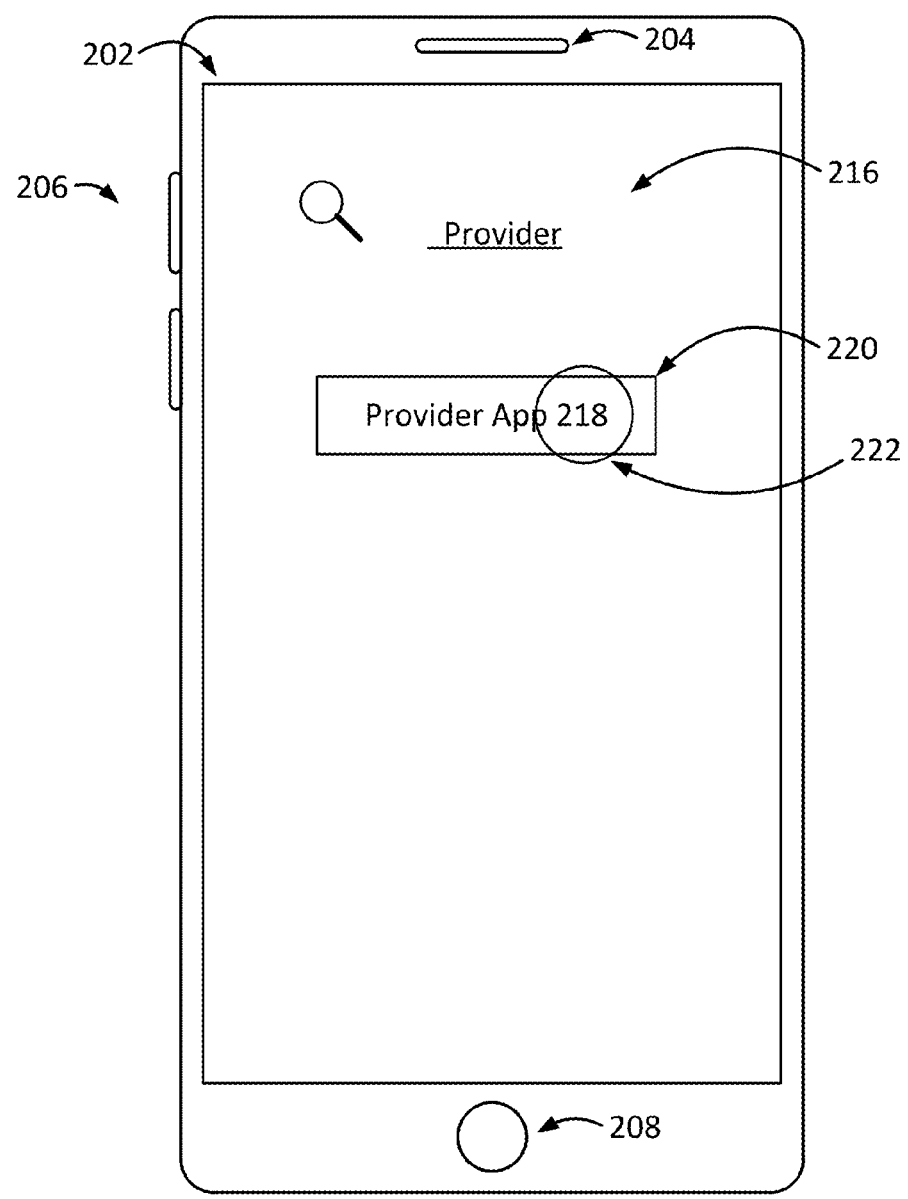
FIG. 2B illustrates an exemplary mobile system with a search for a provider application, according to an embodiment.

FIG. 2B illustrates an exemplary mobile system 200 with a search 216 for a provider application 218, according to an embodiment. As shown, the mobile system 200 includes the I/O interface 202, the speaker 204, the one or more buttons 206, and the button 208 described above. Yet further, the mobile system 200 may display the search 216, possibly referred to a search feature 216. In some instances, the search feature 216 may be configured to search for and/or identify one or more mobile applications, where the mobile system 200 may be configured to install the one or more mobile applications. For example, as shown, the words, "Provider," may be entered with the search feature 216. Yet, it should be noted that other words, such as "PayPal," may be entered as well. Based on the search 216 with "Provider," one or more search results may be retrieved. For instance, as shown, a touch sense button 220 may be displayed by the mobile system 200 indicating the "Provider App 218," possibly also referred to as the provider application 218. Notably, the provider application 218 may be a mobile application for a provider, such as PayPal, Inc. of San Jose, Calif., USA.

In some embodiments, the mobile system 200 may detect a selection 222 of the touch sense button 220. As such, the mobile system 200 may begin installing the provider application 218. In particular, the mobile system 200 may begin installing and/or downloading the provider application 218 over one or more networks, such as the one or more networks 108, and possibly receiving data from the provider server 102 described above in relation to FIG. 1. In some embodiments, the mobile system 200 may include a non-transitory memory that takes the form of the data storage 136 described above. Further, the mobile system 200 may include one or more hardware processors that take the form of the one or more hardware processors 134. As described, the one or more hardware processors 134 may be coupled to the non-transitory memory 136 and configured to read instructions from the non-transitory memory 136 to cause the mobile system 200 to perform operations, such as installing and/or downloading the provider application 218.

In some embodiments, the mobile system 200 may also determine a request to install the provider application 218. In some instances, the request to install the provider application 218 may be in the form of the selection 222 of the button 220 described above. As such, the mobile system 200 may begin installing the provider application 218 to the mobile system 200 based on one or more user inputs received by the mobile system 200. The mobile system 200 may also determine a number of other applications 210, 212, and/or 214 installed on the mobile system 200. As such, the mobile system 200 may also determine one or more configurations of the provider application 218 based on the other applications 210, 212, and/or 214 installed on the mobile system 200, including, but not limited to the number of applications, the type of the applications, the number of specific applications, the placement of specific applications, and the frequency or the usage of specific applications. For example, the one or more configurations of the provider application 218 may be determined to transfer funds and/or make a transaction with the provider application 218, possibly transfers and/or transactions associated with the other applications 210, 212, and/or 214. Thus, the mobile system 200 may install the provider application 218 to the mobile system 200 based on the one or more configurations of the provider application 218 determined.

For example, consider the elderly user described above such that the mobile system 200 is the elderly user's mobile device. In such instances, the mobile system 200 may determine, predict, and/or detect a user input with the application 210 to measure the user's blood pressure, possibly where the application 210 is accessed or activated. Further, the mobile system 200 may determine, predict, and/or detect a user action to take medication based on the medication reminder application 212, possibly where the application 212 generates a reminder notification. Yet further, the mobile system 200 may determine, predict, and/or detect an input with the drug store application 214 to purchase medication from one or more drug stores, possibly based on the drug store application 214 accessed or activated. As such, the configurations of the provider application 218 may be determined based on the user inputs determined, predicted, and/or detected.

In another example, consider the younger user described above such that the mobile system 200 is the younger user's mobile device. In such instances, the mobile system 200 may determine and/or predict a user input to call a taxi based on the taxi application 210 being accessed. Further, the mobile system 200 may determine and/or predict a user input to check-in to a flight and/or track flight statuses based on the airline application 212 being accessed. Yet further, the mobile application 200 may determine and/or predict a user input to order food based on the food ordering application 214 being accessed, among other possible user inputs associated with possibilities where the provider application 218 is used to transfer funds. As such, the configurations of the provider application 218 may be determined based on the user inputs determined, predicted, and/or detected.

Figure 2C:
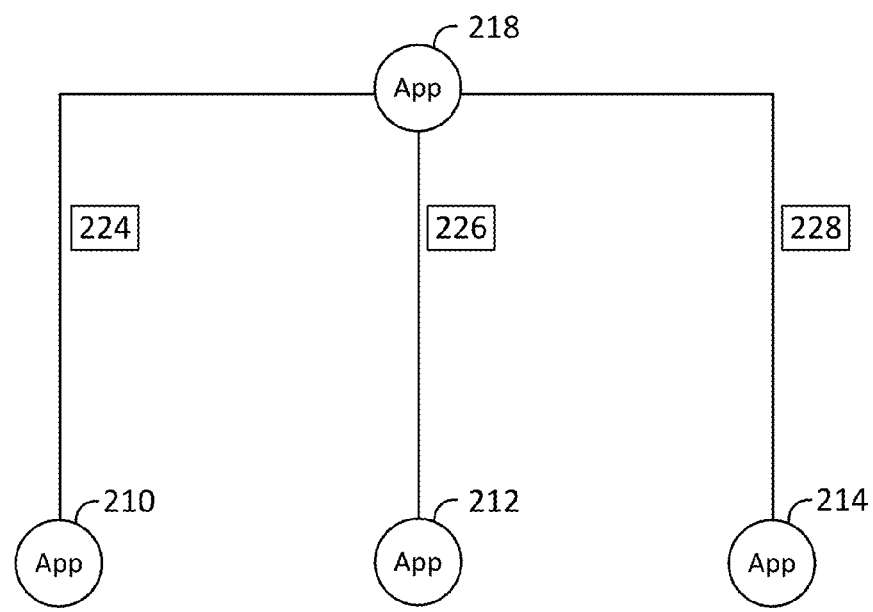
FIG. 2C illustrates an exemplary mobile system with a provider application and other applications, according to an embodiment.

FIG. 2C illustrates an exemplary mobile system 200 with the provider application 218 and other applications 210-214, according to an embodiment. As shown, the provider application 218 may retrieve data 224, 226, and/or 228 from each of the other applications 210, 212, and/or 214, respectively. Thus, the data 224, 226, and/or 228 may be specific to the applications 210, 212, and/or 214, respectively, possibly indicating the placements of the applications 210, 212, and/or 214 on a screen, the frequency in updating the applications 210, 212, and/or 214, and/or times associated with deleting the applications 210, 212, and/or 214. In some instances, possibly based on the installation of the provider application 218, the provider application 218 may transmit a call to the operating system of the mobile system 200 to retrieve the data 224, 226, and/or 228 from the operating system. By retrieving the data 224, 226, and/or 228, the provider application 218 may identify the other applications 210, 212, and/or 214, respectively. Further, the mobile system 200 and/or the provider application 218 may determine one or more configurations of the provider application 218 based on the data 224, 226, and/or 228 retrieved.

In some embodiments, the data 244, 226, and/or 228 may indicate the content provided by the applications 210, 212, and/or 214, respectively. As such, in some instances, the mobile system 200 may determine the content provided by the applications 210, 212, and/or 214. For example, consider the scenarios above where a user has a Spanish television application 210 on the mobile system 200. As such, the mobile system 200 may determine one or more languages associated with content 224 provided by the application 210, such as the Spanish content. Notable, the mobile system 200 may also determine one or more languages associated with content 226 and/or 228 provided by the other applications 212 and/or 214, respectively, on the mobile system 200. As such, the mobile system 200 may configure the provider application 218 to communicate in the one or more languages, such as the Spanish language. Further, the provider application 218 may be installed based on the provider application 218 configured to communicate in the one or more languages, such as in Spanish, English, and/or other languages as well.

In some embodiments, the mobile system 200 and/or the provider application 218 may determine one or more types of content 224, 226, and/or 228 accessed by the other applications 210, 212, and/or 214, respectively, installed on the mobile system 200. In some instances, the one or more types of content 224, 226, and/or 228 accessed may include merchandise content. For example, the merchandise content may include image content of a clothing item that the user may be interested in. Further, the merchandise content may include multimedia content (e.g., advertisement content), content associated with bar codes (e.g., coupons), among other types of data content. Thus, in some instances, the mobile system 200 may determine the one or more configurations associated with the provider application 218, possibly to purchase items, based on the one or more types of content 224, 226, and/or 228 determined.

In some embodiments, the mobile system 200 may determine a frequency in which each application of the other applications 210, 212, and/or 214 is accessed. For example, the data 224, 226, and/or 228 retrieved from the other applications 210, 212, and/or 214, respectively, may indicate the number of times the other applications 210, 212, and/or 214 are accessed, possibly over one or more periods of time. As such, the mobile system 200 may determine the one or more configurations associated with the provider application 218 based the frequency in which each application 210, 212, and/or 214 is accessed.

For example, consider the scenarios described above such that the application 210 may be the taxi application, the application 212 may be the airline application, and the application 214 may be the food ordering application. The mobile system 200 may determine that the taxi application 210 is accessed every weekend, the airline application 212 is accessed once a month, and the food ordering application 214 is accessed every other day of the week. As such, the mobile system 200 may determine and/or predict a user input to travel by taxi every weekend, a user input to travel by air once a month, and/or a user input to order food multiple times of the week, among other possibilities potentially related to the provider application 218 transferring funds from the user's account.

In some embodiments, the mobile system 200 may determine a time associated with installing the provider application 218, possibly such that the time indicates a day, a date, an hour, and/or a number of minutes. The mobile system 200 may determine one or more applications accessed from a list of the other applications 210, 212, and/or 214 in a time period from the time associated with installing the provider application 218. For example, the mobile system 200 may determine the provider application 218 is installed at noon or 12:00 PM and the airline application 212 is accessed two hours before at 10:00 AM. As such, the mobile system 200 may determine the airline application 212 is accessed within a two-hour time period before the time associated with installing the provider application 218. As such, the mobile system 200 may determine the one or more configurations associated with the provider application 218 based on the applications 212 accessed in the time period. In the example above, the mobile system 200 may determine and/or predict a user input with the airline application 212 to travel with the airline associated with the airline application 212. Notably, in the scenarios described above, the airline application 212 may be accessed two hours after the provider application 218 is installed and the user input with the airline application 212 may be determined and/or predicted in such scenarios as well. As such, the provider application 218 may provide notifications regarding coupons and/or specials offered by the airline.

Figure 2D:
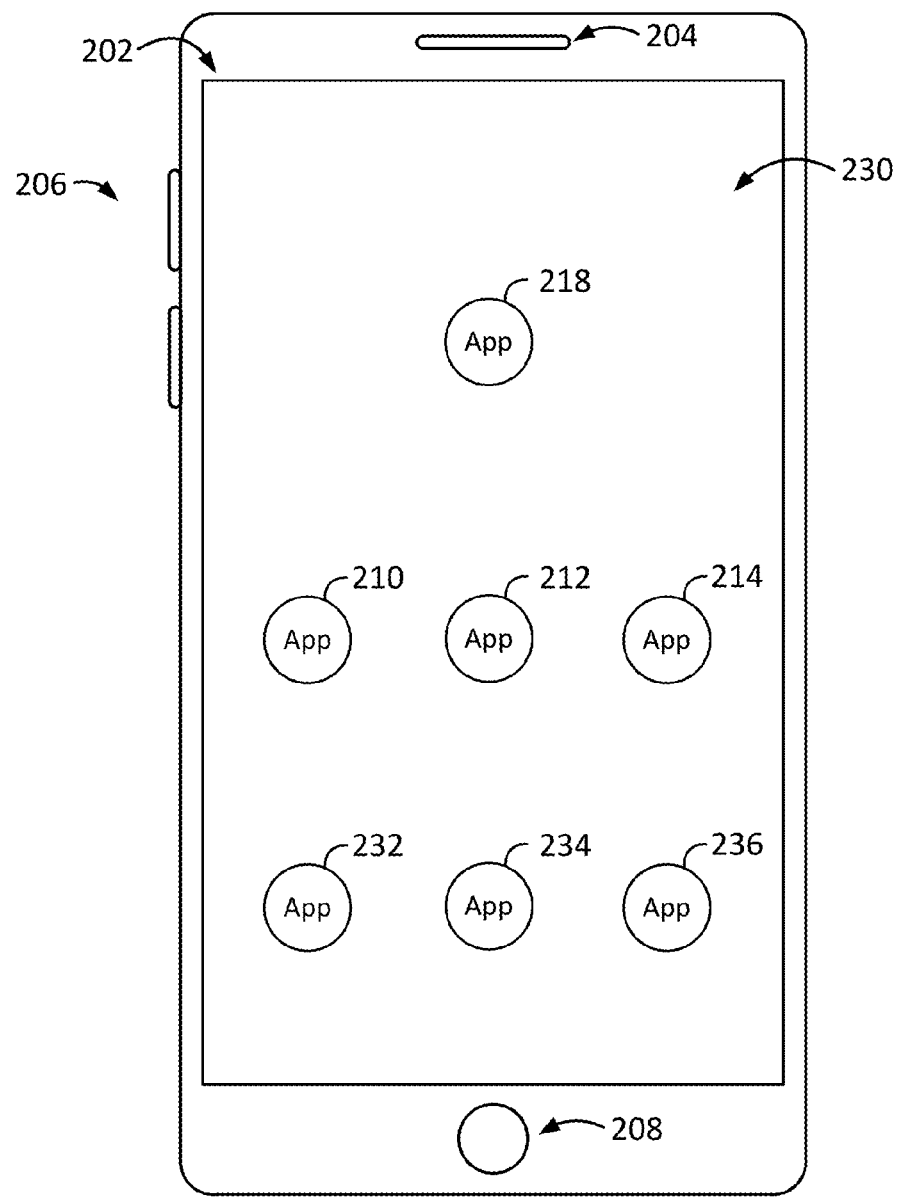
FIG. 2D illustrates an exemplary mobile system with a provider application and a number of other applications, according to an embodiment.

FIG. 2D illustrates an exemplary mobile system 200 with a provider application 218 with a number of other applications 210, 212, and/or 214, described above. As shown, the mobile system 200 may also include a number of other applications 232, 234, 236, according to an embodiment. As shown, the mobile system 200 includes the I/O interface 202, the speaker 204, the one or more buttons 206, and the button 208 described above.

In some embodiments, the mobile system 200 may be configured to display the provider application 218 and the applications 210-214 and 232-236 on a home screen 230 provided by the I/O interface 202. Further, the mobile system 200 may determine a respective position of each of the other applications 210-214 and 232-236 on the home screen 230. As such, the mobile system 200 may determine one or more configurations associated with the provider application 218 based on the respective positions of each of the other applications 210-214 and 232-236 on the home screen 230. In some instances, considering the scenarios above where the application 210 is the taxi service application, the mobile system 200 may determine and/or predict user inputs to access the application 210 frequently based on the position of application 210. In particular, the user inputs may be determined and/or predicted based on the position of the application 210 shown at the top left position among the other applications 212, 214, 232, 234, and/or 236.

Figure 2E:
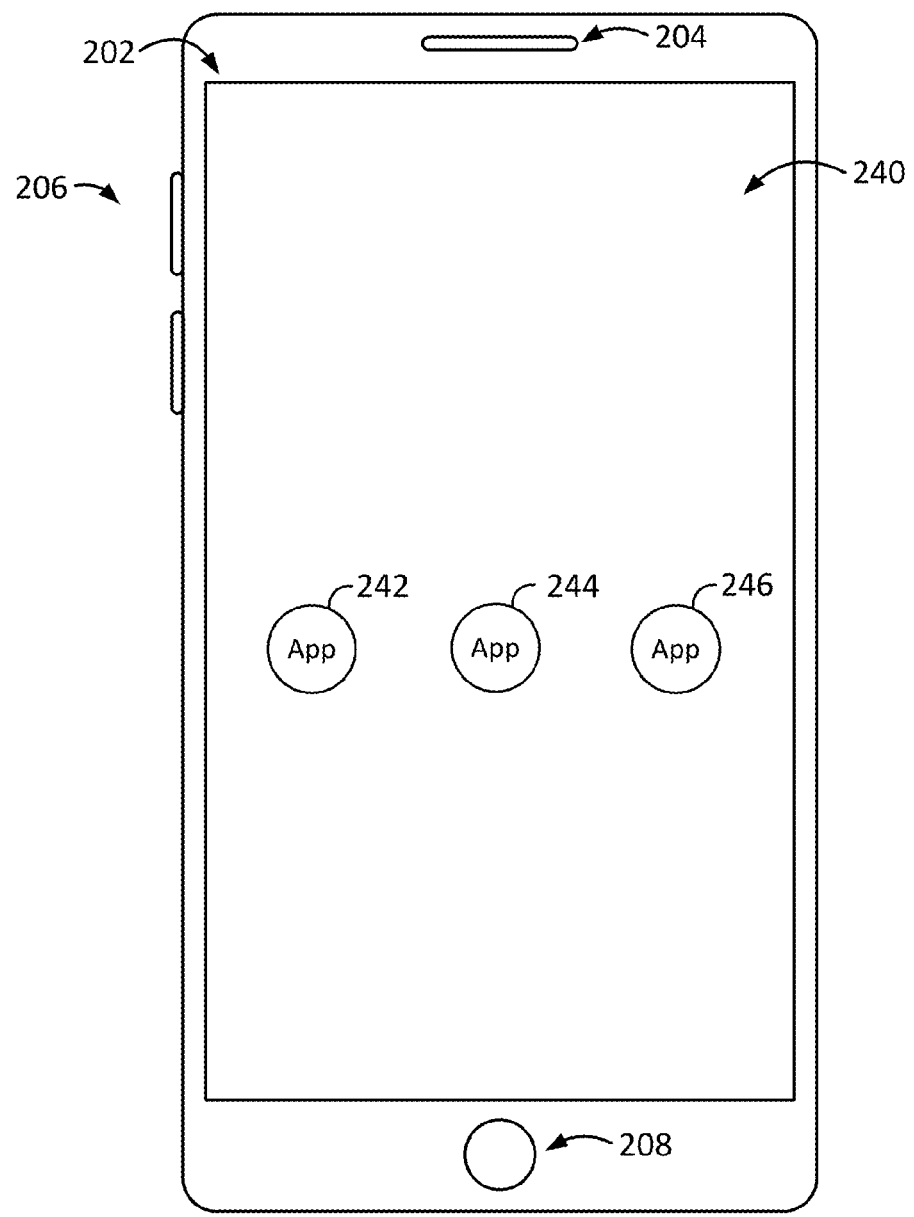
FIG. 2E illustrates an exemplary mobile system with a number of other applications, according to an embodiment.

FIG. 2E illustrates an exemplary mobile system 200 with a number of other applications 242, 244, and 246, according to an embodiment. As shown, the mobile system 200 includes the I/O interface 202, the speaker 204, the one or more buttons 206, and the button 208 described above. Notably, referring back to FIG. 2D, the mobile system 200 may be configured to display the provider application 218 and the applications 210-214 and 232-236 on a home screen 230 provided by the I/O interface 202. Yet further, as shown in FIG. 2E, the mobile system 200 may be configured to display the applications 242-246 on a second home screen 240. For example, the applications 242-246 may be gaming applications for playing games, sports applications for retrieving scores to sports games, and/or notes applications for taking notes. In some instances, the mobile system 200 may be configured to change from the first home screen 230 to the second home screen 240, and also from the second home screen 240 to the first home screen 230, possibly based on one or more touch inputs, such as swipes detected by the I/O interface 202. Thus, the mobile system 200 may be configured to display the first home screen 230 and the second home screen 240.

In some embodiments, the mobile system 200 may determine a respective position of each of the other applications 210-214 and 232-236 on the first home screen 230 and each of the other applications 242-246 on the second home screen 240. As such, the mobile system 200 may determine one or more configurations associated with the provider application 218 based on the respective positions of each of the other applications 210-214 and 232-236 on the first home screen 230 and each of the other applications 242-246 on the second home screen 240. In some instances, the mobile system 200 may determine and/or predict one or more user inputs to access the applications 210-214 and 232-236 on the first home screen 230 more frequently than the other applications 242-246 on the second home screen 240. As such, the mobile system 200 may determine and/or predict one or more user inputs to access the applications 210-214 and 232-236 to make transactions and/or transfer funds with the provider application 218. In some instances, the mobile system 200 may determine and/or predict such inputs more frequently than inputs to access the applications 242-246. As such, the provider application 218 may be configured based on the determined and/or predicted inputs to operate more efficiently with the applications 210-214 and 232-236, thereby improving mobile technologies associated with mobile applications. Notably, the mobile system 200 may be referred to as a mobile device 200.

In some embodiments, the mobile device 200 may include a non-transitory machine-readable medium that takes the form of the data storage 136 described above in relation to FIG. 1. Further, the medium may have stored thereon machine-readable instructions executable to cause a machine, such as the mobile device 200, to perform operations. In some instances, the mobile device 200 may determine a fund transfer application 232 activated from the number of other applications 210-214, 234, and 236 installed on the mobile device 200. In some instances, the fund transfer application 232 may also be referred to as a second provider application 232, possibly based on the application 232 being provided by a second provider. For example, the second provider may be a competitor entity to the provider of the application 218.

In some instances, the mobile device 200 may detect a touch input received with the I/O interface 202 that corresponds to the position of the application 232 shown in FIG. 2D. As such, the mobile device 200 may determine and/or predict one or more user inputs, such as an input to transfer funds with one or more user accounts associated with the fund transfer application 232, possibly based on the fund transfer application 232 activated. In some instances, the provider application 218 on the mobile device 200 may be activated based on the determined and/or predicted input to transfer funds with the one or more user accounts. As such, the provider application 218 may be used to transfer funds in lieu of the second provider application 232.

In some embodiments, considering the scenarios above, the mobile device 200 may determine that the taxi application 210 and/or the airline application 212 is accessed, activated, and/or opened, possibly among the other applications 214, 232-236, and 242-246 installed on the mobile device 200. As noted, the mobile device 200 may determine and/or predict one or more user inputs to travel with the taxi application 210 and/or the airline application 212 based on the taxi application 210 and/or the airline application 212 activated. Further, the mobile device 200 may determine and/or predict an input to use the provider application 218 to pay for a taxi reserved with the taxi application 210. Yet further, the mobile device 200 may determine and/or predict an input to use the provider application 218 to pay for a flight, a flight upgrade, and/or items at an airport, where such details are viewable with the airline application 212. As such, the provider application 218 on the mobile device 200 may be activated based on the determined and/or predicted input with the provider application 218 to transfer funds.

In some embodiments, the mobile device 200 may determine the food ordering application 214 is activated (e.g., accessed and/or opened), possibly from among the other applications 210, 212, 232-236, and 242-246 installed on the mobile device 200. In some instances, the mobile device 200 may determine and/or predict one or more inputs with the food ordering application 214 to obtain food based on the food ordering application 214 activated. Further, the mobile device 200 may determine and/or predict a fund transfer with the provider application 218 to pay for the food ordered. As such, the provider application 218 on the mobile device 200 may be activated based on the determined and/or predicted input with the food ordering application 214 to obtain food and/or the determined and/or predicted fund transfer with the provider application 218 to pay for the food ordered. Notably the mobile device 200 may also determine and/or predict inputs with the gaming applications 242-246 to play games based on one of the gaming applications 242-246 activated. As such, the provider application 218 may also be activated based on the determined and/or predicted fund transfers to purchase one or more games associated with one or more of the gaming applications 242-246.

Figure 3A:
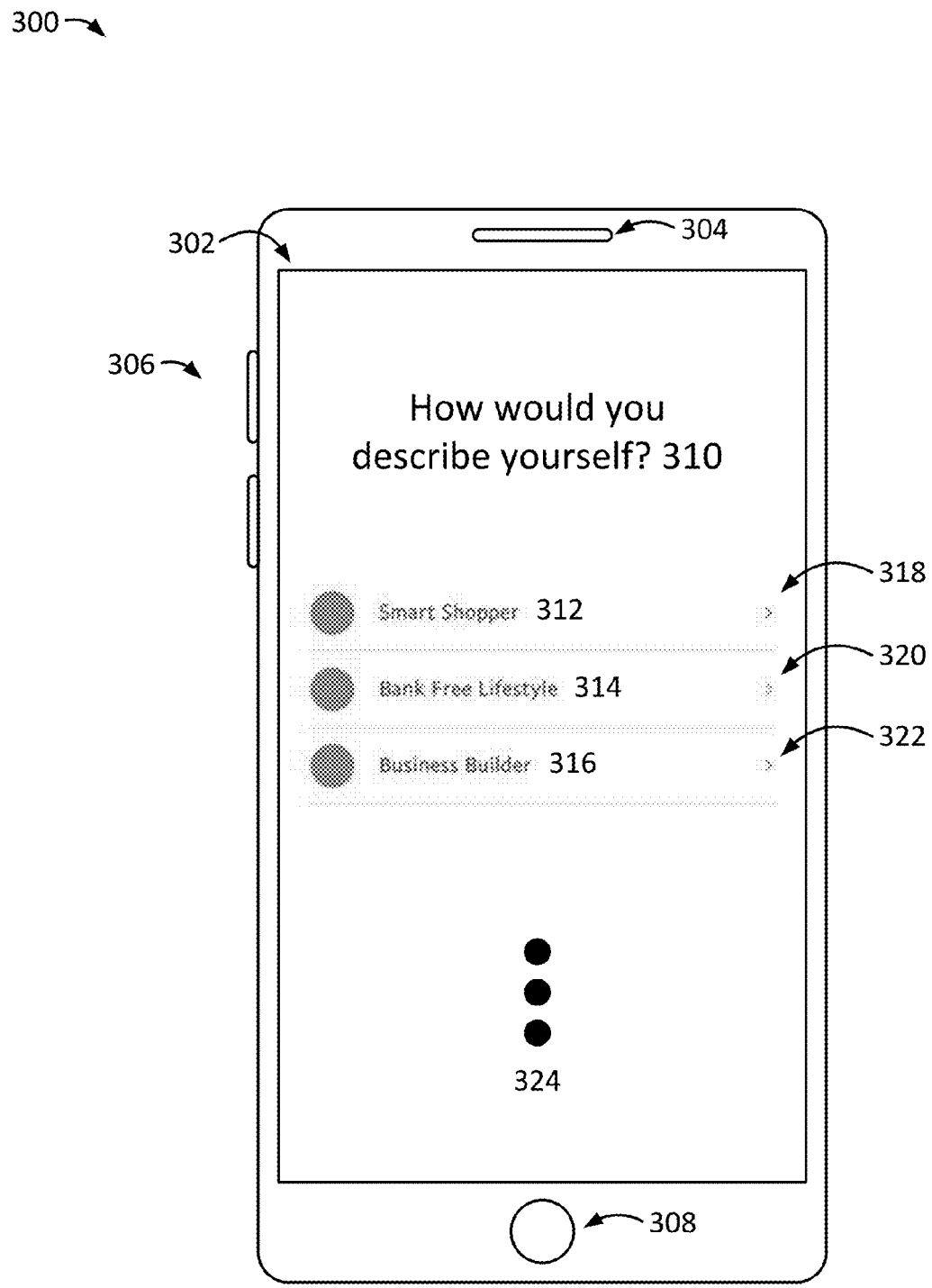
FIG. 3A illustrates an exemplary mobile system with an inquiry, according to an embodiment.

FIG. 3A illustrates an exemplary mobile system 300 with an inquiry 310, according to an embodiment. As shown, the mobile system 300 may take the form of the mobile system 200 described above in relation to FIGS. 2A-2D. As such, the mobile system 300 may include an I/O interface 302, a speaker 304, one or more buttons 306, and/or a button 308 with a fingerprint sensor that may take the form of the I/O interface 202, the speaker 204, one or more buttons 206, and/or a button 208, respectively, as described above.

In some embodiments, the mobile system 300 may display a number of inquiries associated the provider application 218 installed, as described above. As shown, for example, the mobile system 300 displays the inquiry 310, "How would you describe yourself?" Further, the inquiry 310 may include a number of descriptors, such as the "Smart Shopper" descriptor 312, the "Bank Free Lifestyle" descriptor 314, and the "Business Builder" descriptor 316. Yet further, each of the descriptors 312, 314, and 316 may correspond with the buttons 318, 320, and 322, respectively. Thus, the mobile system 300 may retrieve responses to the number of inquiries, such as the inquiry 310, based on user inputs received by the mobile system 300. In particular, the responses or selections may be received based on the user inputs received with the buttons 318, 320, and/or 322.

In some embodiments, the mobile system 300 may determine one or more configurations associated with the provider application 218 based on the responses and/or selections retrieved. For example, the configurations may be determined based on a user input received with the button 318 that selects the "Smart Shopper" descriptor 312. In such instances, the configurations of the provider application 218 may be determined to include a preference to receive coupons, bargains, and/or notifications for lower prices from the provider application 218. As such, the mobile system 300 may install and/or configure the provider application 218 based on the one or more configurations determined with the responses and/or selections retrieved.

In another example, the mobile system 300 may determine one or more configurations associated with the provider application 218 based on a user input received with the button 320 that selects the "Bank Free Lifestyle" descriptor 314. In such instances, the configurations of the provider application 218 may be determined to include a preference to avoid receiving bank-like statements, financial information, and/or information regarding financial vehicles, such as 401K's, certificates of deposit, and/or money markets, among other similar types of information. As such, the mobile system 300 may be install and/or configure the provider application 218 based on the one or more configurations determined with such responses and/or selections retrieved.

In another example, the mobile system 300 may determine one or more configurations associated with the provider application 218 based on a user input received with the button 322 that selects the "Business Builder" descriptor 316. In such instances, the configurations of the provider application 218 may be determined to build and/or setup a business. For example, considering the scenarios described above, the elderly user may have an intent to use the provider application 218 for a pottery business. As such, the mobile system 300 may install and/or configure the provider application 218 based on the one or more user intents associated with the pottery business based on the responses and/or selections retrieved. Notably, many more descriptors may also be displayed by the computing system 300, as shown with the ellipses 324.

Figure 3B:
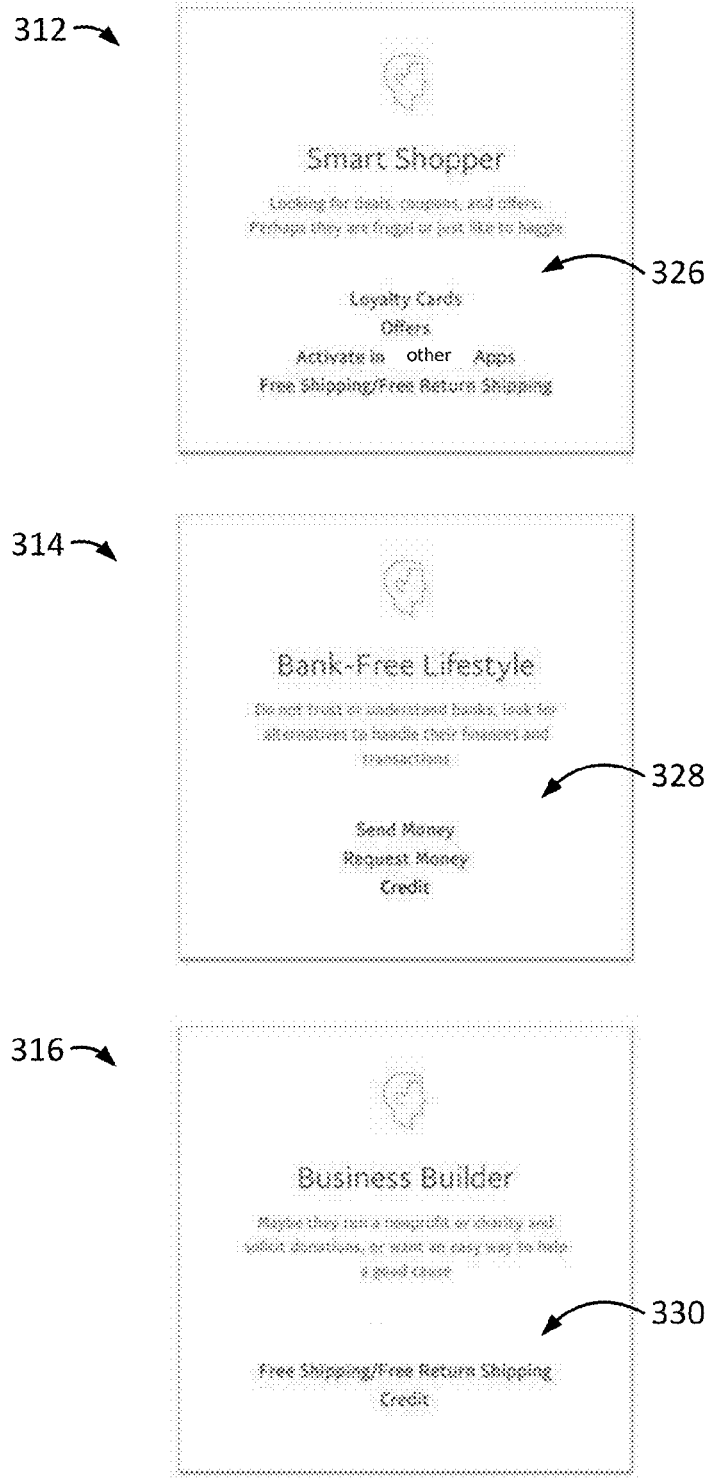
FIG. 3B illustrates an exemplary number of descriptors, according to an embodiment.

FIG. 3B illustrates an exemplary number of descriptors 312, 314, and/or 316, according to an embodiment. As described above in relation to FIG. 3A, the descriptors 312, 314, and/or 316 may be selected with the buttons 318, 320, and/or 322, respectively. In some instances, the mobile system 300 may provide further information associated with the descriptors 312, 314, and/or 316, possibly to further determine one or more configurations of the provider application, such as the application 218 described above.

For example, consider a scenario where a user selects the Smart Shopper descriptor 312. As similarly described above, the user may have an interest to look for deals, coupons, and/or offers. As shown, the descriptor 312 may have interests 326 associated with loyalty cards, offers, a feature that activates the provider application 218 in the other applications 210-214, 232-236, and/or 242-246, free shipping, and/or free return shipping, among other possibilities.

Further, consider another scenario where the younger user described above selects the Bank-Free Lifestyle descriptor 314. As such, the younger user may have an interest to send money, request money, and/or determine credit. Further, the younger user may intend to have an account without receiving the bank-like statements and/or the banking information described above. As shown, the descriptor 314 may have interests 328 associated with sending money, requesting money, and/or receiving credit, among other possibilities.

Yet further, consider another scenario where the elderly user described selects the Business Builder descriptor 316, possibly to facilitate her pottery business. As such, the elderly user may intend to set up the business and/or use the provider application 218 for business purposes. As shown, the descriptor 316 may include interests 330 associated with free shipping, free return shipping, and/or receiving credit.

Figure 3C:
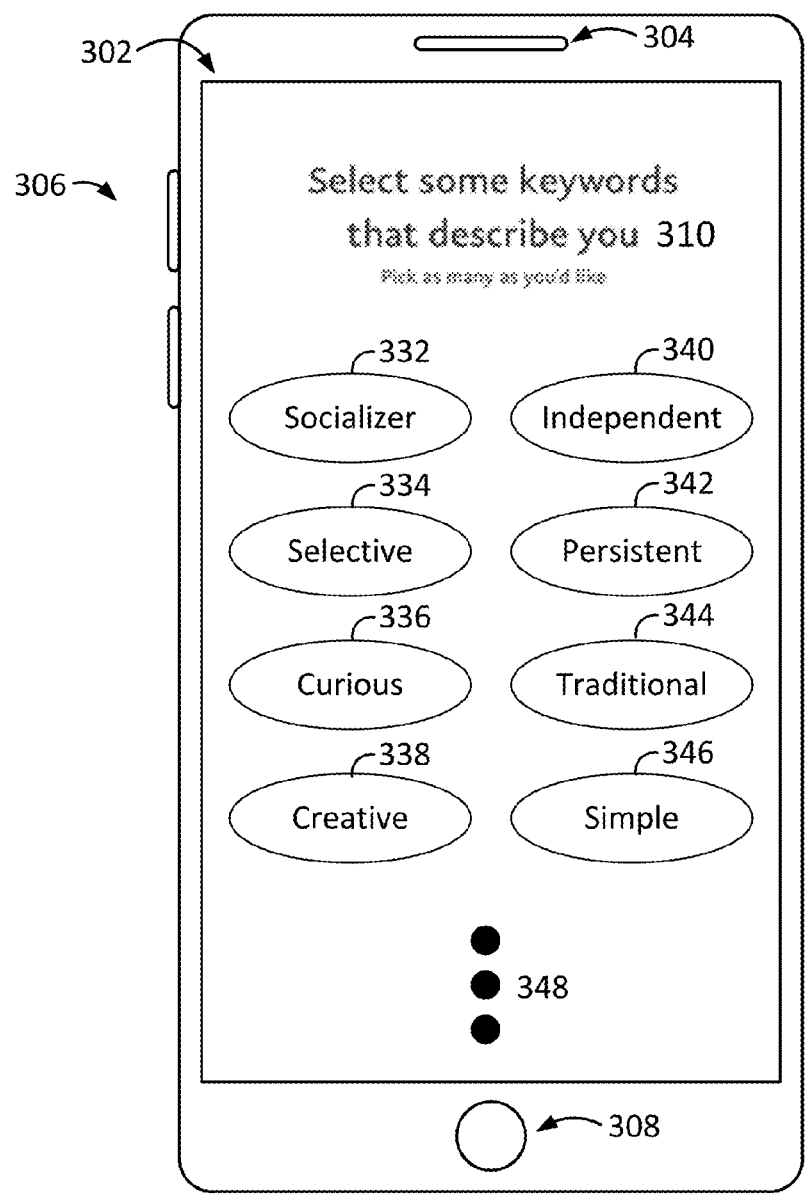
FIG. 3C illustrates an exemplary number of descriptor buttons, according to an embodiment.

FIG. 3C illustrates an exemplary number of descriptor buttons 332-346, according to an embodiment. In some instances, the mobile system 300 may detect selection of the buttons 332-346 to determine one or more configurations of the provider application, such as the provider application 218. As shown, the descriptor button 332 indicates "Socializer," the descriptor button 334 indicates "Selective," the descriptor button 336 indicates "Curious," the descriptor button 338 indicates "Creative," the descriptor button 340 indicates "Independent," the descriptor button 342 indicates "Persistent," the descriptor button 344 indicates "Traditional," and the descriptor button 346 indicates "Simple."

As noted, the mobile system 300 may determine one or more configurations of the provider application 218 based on one or more selections of the buttons 332-346. For example, based on a selection of the button 332, the mobile system 300 may determine configurations of the provider application 218 to use the provider application 218 socially, possibly in connection to one or more social networks. Based on a selection of the button 334, the mobile system 300 may determine configurations of the provider application 218 based on a characteristic of the user being selective with various payment options that the provider application 218 may provide. Based on a selection of the button 336, the mobile system 300 may determine configurations of the provider application 218 to receive various types of information accessible with the provider application 218. Yet further, based on selections of the buttons 338, 340, 342, 344, and/or 346, various configurations of the provider application 218 may be determined accordingly. Notably, there may be various other buttons that may be viewed, as illustrated with the ellipses 348.

Figure 4A:
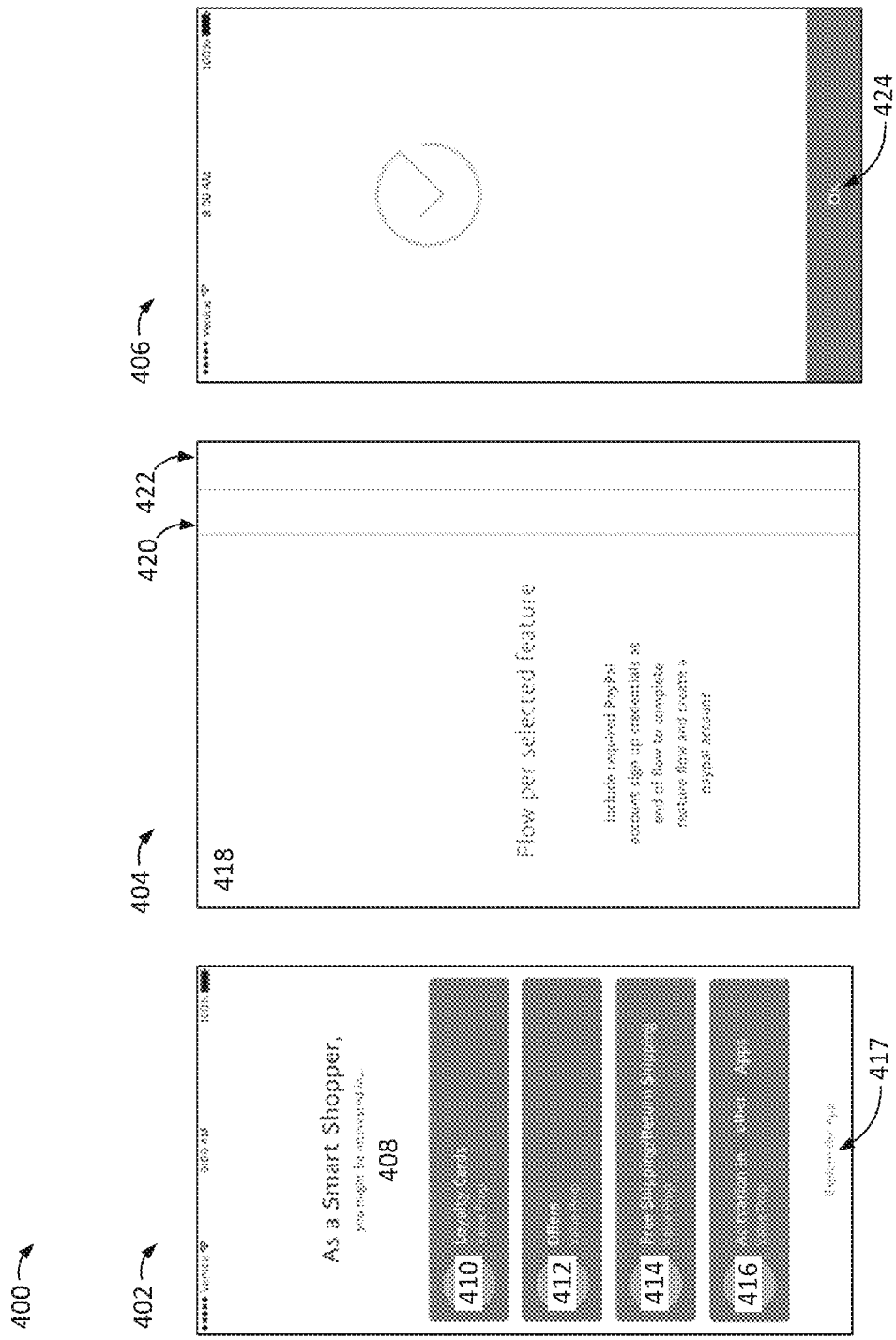
FIG. 4A illustrates an exemplary system with a number of interfaces, according to an embodiment.

FIG. 4A illustrates an exemplary system 400 with a number of interfaces 402, 404, and 406, according to an embodiment. As shown, the system 400 may include various aspects of the mobile systems 200 and 300 described above in relation to FIGS. 2A-3C. In particular, each of the interfaces 402, 404, and/or 406 may be provided by the provider application 218 displayed by the mobile systems 200 and/or 300.

Further, as shown, the interface 402 includes the "Smart Shopper" descriptor 408 that may correspond to the Smart Shopper descriptor 312 described above in relation to FIGS.

3A and 3B. In some instances, by selecting the button 318 shown in FIG. 3A, the mobile system 300 may provide the interface 402. Yet further, as shown, the descriptor 408 includes, "You might be interested in . . . ," and the interface 402 further provides feature buttons 410, 412, 414, and 416 that may be selected. In particular, the feature button 410 indicates "Loyalty Cards" and value propositions associated with loyalty cards possibly offered by the provider application 218. The feature button 412 indicates "Offers" and value propositions associated with various offers possibly provided by the provider application 218. The feature button 414 indicates "Free Shipping/Return Shipping" and related value propositions associated with shipping items with the provider application 218. The feature button 416 indicates "Activation in other Apps," possibly to activate the provider application 218 with the other applications 210-214, 232-236, and/or 242-246, as described above.

Yet further, as shown, the interface 404 includes a flow 418 with a number of interfaces other 420 and/or 422. The flow 418 may correspond with one or more of the feature buttons 410, 412, 414, and/or 416 selected. For example, by selecting the button 410, the flow 418 may be initiated. Further, the flow 418 may initiate the other interfaces 420 and 422. Further, the flow 418 may enable users to generate accounts with the provider based on user credentials to complete the feature flow 418. In addition, as shown, the interface 406 may illustrate a checkmark to indicate that the flow 418 has been completed and the button 424 may be selected to confirm the completed flow 418.

Figure 4B:
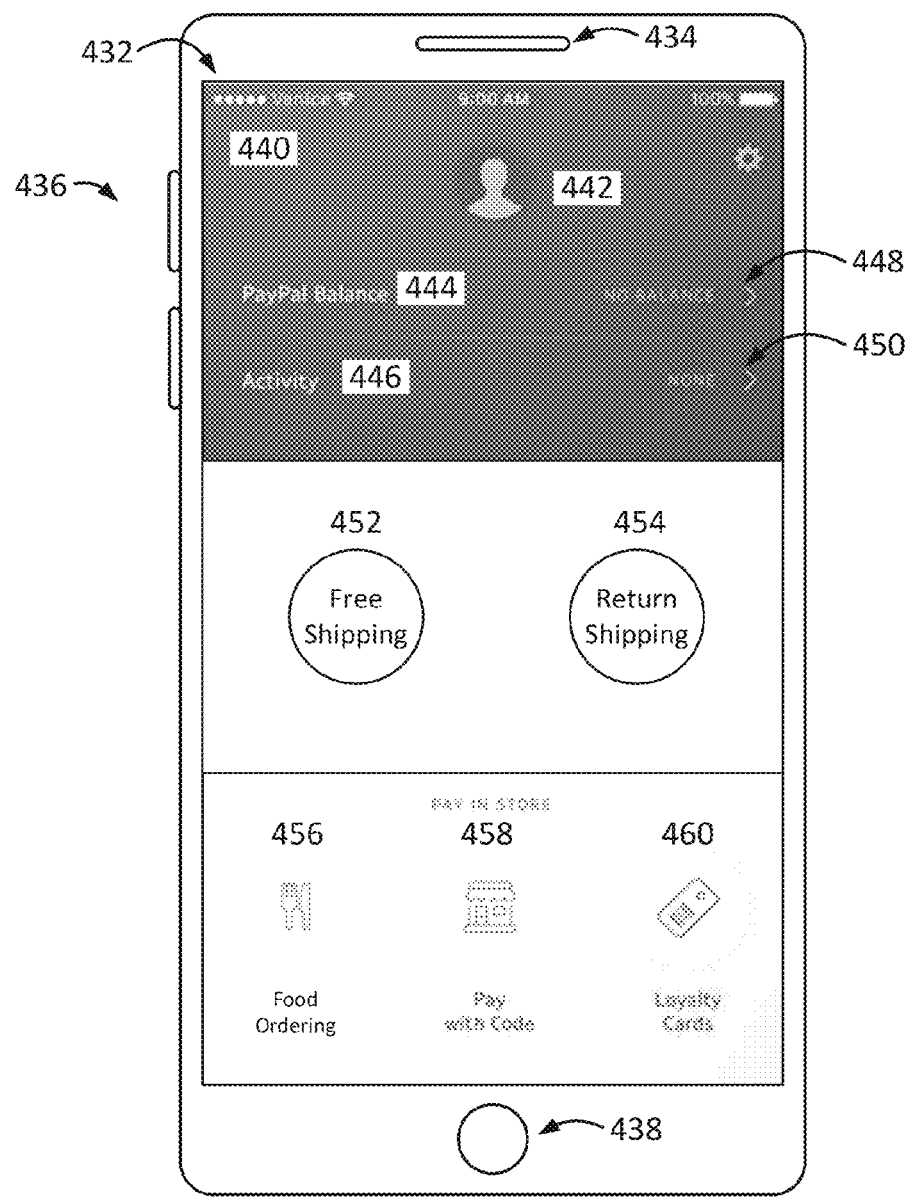
FIG. 4B illustrates the exemplary system with a provider application, according to an embodiment.

FIG. 4B illustrates the exemplary mobile system 400 with a provider application 440, according to an embodiment. As shown, the mobile system 400 may take the form of the mobile system 200 and/or 300 described above in relation to FIGS. 2A-3C. As such, the mobile system 400 may include an I/O interface 432, a speaker 434, one or more buttons 436, and/or a button 438 with a fingerprint sensor that may take the form of the I/O interface 302, the speaker 304, one or more buttons 306, and/or a button 308, respectively, as described above.

Further, the provider application 440 may take the form of the provider application 218 described above. For example, the provider application 440 may be displayed based on selecting the provider application 218 shown in FIG. 2D. As such, the provider application 440 may display a user account 442, an account balance 444, and one or more activities 446 associated with the user account 442. Further, as shown, the balance button 448 may be selected to display an amount in the account balance 442 and the activity button 450 may be selected to display the one or more activities 446, such as one or more fund transfers of the account balance 444.

Yet further, the provider application 440 may display a free shipping button 452 and/or a free return shipping button 454. In some instances, considering the user with the pottery business described above, the provider application 440 may display the free shipping button 452 and/or the return shipping button 454 based on items shipped for the pottery business. For example, referring back to FIG. 2C, the provider application 440 may display the buttons 452 and/or 454 based on the data 224, 226, and/or 228 retrieved from the other applications 210, 212, and/or 214, respectively, installed on the mobile system 400, possibly indicating items shipped for the pottery business. In some instances, the provider application 440 may display the buttons 452 and/or 454 based on the button 322 selected in response to the inquiry 310 that corresponds to the business builder descriptor 316, among other possibilities.

In addition, the provider application 418 may display the food ordering button 456, possibly based the feature button 416 being selected to activate the provider application 418 with the other applications, such as the applications 210, 212, and/or 214. Further, the provider application 418 may display the pay with code button 426, possibly based on the button 320 being selected that corresponds to the bank free lifestyle descriptor 314. Yet further, the provider application 418 may display the loyalty cards button 460, possibly based on the feature button 410 selected that corresponds to the loyalty cards feature.

In some embodiments, the mobile system 400, possibly referred to as the mobile device 400, may include a non-transitory machine-readable medium, possibly taking the form of the data storage 136 described above in relation to FIG. 1. Further, the medium may have stored thereon machine-readable instructions executable to cause a machine, such as the mobile device 400, to perform operations. In some embodiments, the mobile device 400 may determine a request to activate the provider application 440 on the mobile device 400 based on one or more inputs received by the mobile device 400. Further, the mobile device 400 may determine a number of other applications installed on the mobile device 400, such as the applications 210-214, 232-236, and/or 242-246. Yet further, the mobile device 400 may determine one or more configurations associated with the provider application 440 based on the number of other applications 210-214, 232-236, and/or 242-246 installed on the mobile device 400. Further, the mobile device 400 may activate the provider application 440 on the mobile device 400 based on the one or more determined configurations of the provider application 440.

In some embodiments, the mobile device 400 may determine one or more location settings associated with the mobile device 400 that enables the mobile device 400 to detect one or more locations of the mobile device 400. In some instances, the one or more configurations of the provider application 440 includes a configuration of the provider application 440 to receive one or more offers based on the one or more locations of the mobile device 400 and/or one or more location services activated on the mobile device 400. Further, the provider application 430 of the mobile device 400 may be activated based on the configurations to receive the one or more offers, possibly also based on the feature button 410 selected.

In some embodiments, the mobile device 400 may determine one or more notification settings of the mobile device 400 that causes the mobile device 400 to display one or more notifications associated with the number of other applications 210-214, 232-236, and/or 242-246 installed on the mobile device 400. For example, the notification settings may include settings of the mobile device 400 to display push notifications generated by the server 102 described above and/or settings with the mobile device 400 for ring tones. In some instances, the one or more determined configurations of the provider application 440 may include a configuration to receive the one or more notifications associated with the number of other applications 210-214, 232-236, and/or 242-246. As such, the mobile device 400 may configure the provider application 440 to provide the one or more notifications, possibly based on a user intent to receive the one or more notifications.

In some embodiments, the mobile device 400 may determine one or more font settings associated with first content provided by the number of other applications 210-214, 232-236, and/or 242-246 installed on the mobile device 400. In some instances, the mobile device 400 may configure the provider application 440 with the one or more font settings determined. Further, the provider application 440 activated may cause the mobile device 400 to display second content based on the one or more font settings determined.

Figure 5:
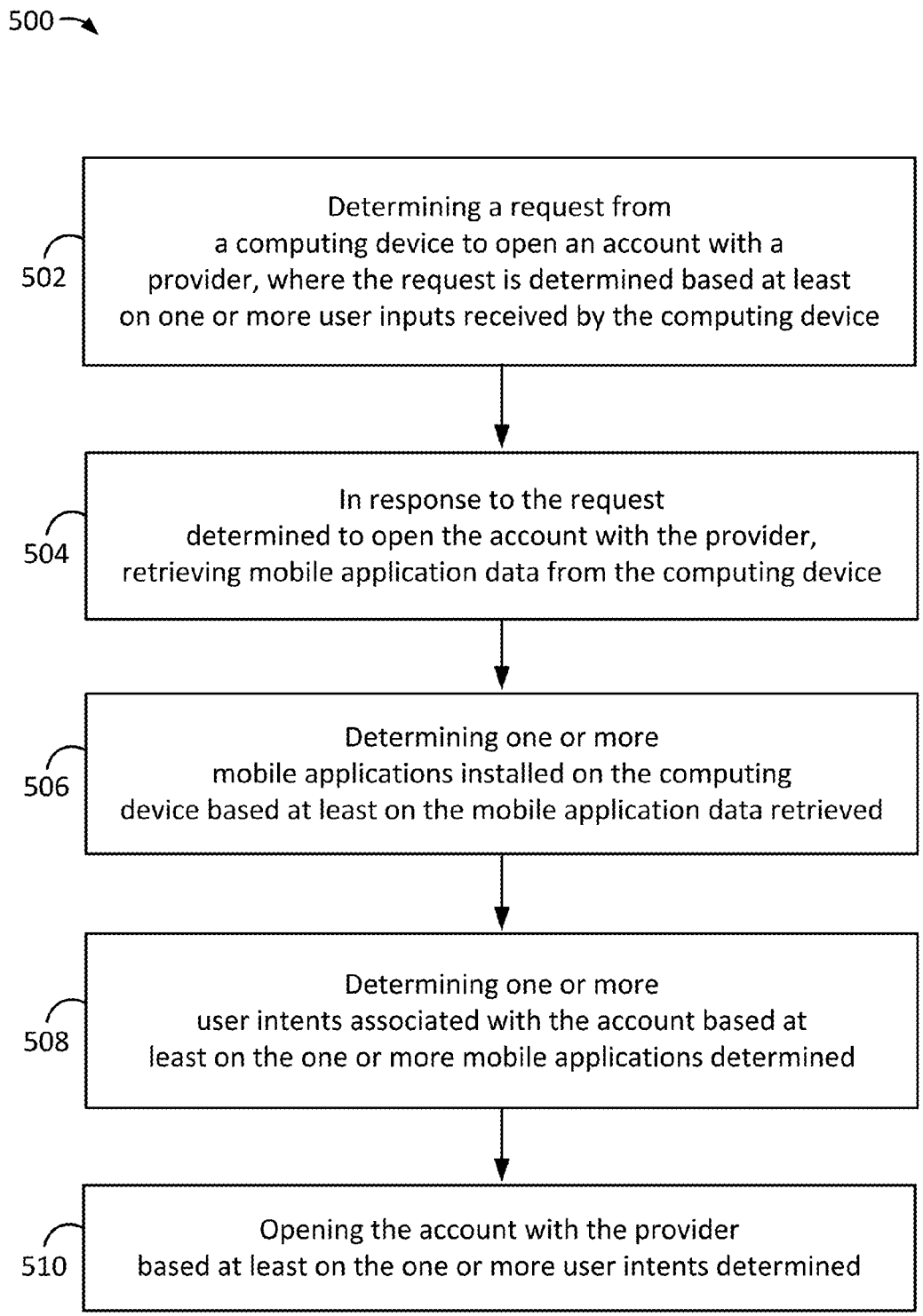
FIG. 5 illustrates an exemplary method, according to an embodiment.

FIG. 5 illustrates an exemplary method 500, according to an embodiment. Notably, one or more steps of the method 500 described herein may be omitted, performed in a different sequence, and/or combined with other methods for various types of applications contemplated herein.

At step 502, the method 500 may include determining a request from a computing device to open an account with a provider, where the request is determined based at least on one or more user inputs received by the computing device. For example, referring back to FIG. 1, the method 500 may include the server 102 determining a request from the computing device 104 to open an account with a provider of the server 102. In some instances, the request may be encoded with the data and/or the data packet 122. Further, the request may be determined based on one or more user inputs received by the computing device 104.

At step 504, in response to the request determined to open the account with the provider, the method 500 includes retrieving mobile application data from the computing device. For example, the method 500 may include the server 102 retrieving the mobile application data from the computing device 104, possibly encoded with the data and/or the data packet 122.

At step 506, the method 500 may include determining one or more mobile applications installed on the computing device based at least on the mobile application data retrieved. For example, the method 500 may include determining the one or more mobile applications 210-214, 232-236, and/or 242-246 installed on the computing device 104.

At step 508, the method 500 may include determining one or more user intents associated with the account based at least on the one or more mobile applications determined. For example, the method 500 may include determine the one or more intents associated with the account 442 based at least one the one or more mobile applications 210-214, 232-236, and/or 242-246.

At step 510, the method 500 may include opening the account with the provider based at least on the one or more user intents determined. For example, the method 500 may include opening the account 442 with the provider based at least on the one or more user intents determined.

In some embodiments, the computing device may take the form of the computing device 400. As such, the method 500 may also include determining one or more images captured by the computing device 400 is associated with one or more merchant locations. As such, the one or more user intents may be determined to include an intent to transfer funds with the account 442 at the one or more merchant locations. As such, the account 442 may be opened based on the intent to transfer funds with the account 442 at the one or more merchant locations.

In some embodiments, the method 500 may include estimating ages of individuals identified in one or more images captured by the computing device 400. As such, the one or more user intents may be determined to include an intent to transfer funds with the account 442 based on the estimated ages of the individuals identified. Further, the account 442 may be opened based on the intent to transfer funds associated with the estimated ages of the individuals identified.

In some embodiments, the method 500 may include determining a number of texts messages associated with a text messaging application of the one or more mobile applications 210-214, 232-236, and/or 242-246 installed on the computing device 400. Further, the method 500 may include determining a number of calls associated with a phone application of the one or more mobile applications 210-214, 232-236, and/or 242-246 installed on the computing device 400. Yet further, the method 500 may include determining a number of emails associated with an email application of the one or more mobile applications 210-214, 232-236, and/or 242-246 installed on the computing device 400. In addition, the method 500 may include determining a usage of the computing device 400 based on at least one of the number of text messages determined, the number of calls determined, and/or the number of emails determined. In some instances, the one or more user intents may be determined based on the usage of the computing device 400 associated with at least one of the number of text messages determined, the number of calls determined, and/or the number of emails determined.

In some embodiments, the method 500 may include determining a time associated with opening the account 442. Further, the method 500 may include determining one or more terms searched with a browser application of the one or more mobile applications 210-214, 232-236, and/or 242-246. Yet further, the one or more terms may be searched in a time period from the time associated with opening the account 442. For example, the terms, "pottery shipping," "pottery shipping services," and/or "potter shipping container" may be searched within one or more days of opening the account 442, and/or one or more days after opening the account 442. As such, the one or more user intents may be determined based on the one or more terms and/or key terms searched with the browser application. As shown in FIG. 4B, the free shipping button 452 and/or the return shipping button 454 may be displayed by the provider application 440.

In some embodiments, the method 500 may include determining one or more online items available associated with the one or more terms searched. For example, the one or more online items may include a shipping container for pottery. As such, one or more intents may be determined to include an intent to obtain the one or more online items available. Further, the account 442 may be opened to provide one or more loyalty cards provided by the button 460 associated with the one or more online items available. Further, the account 442 may provide offers, incentives, and/or coupons associated with the one or more online items available, such as the shipping containers described above.

Figure 6A:
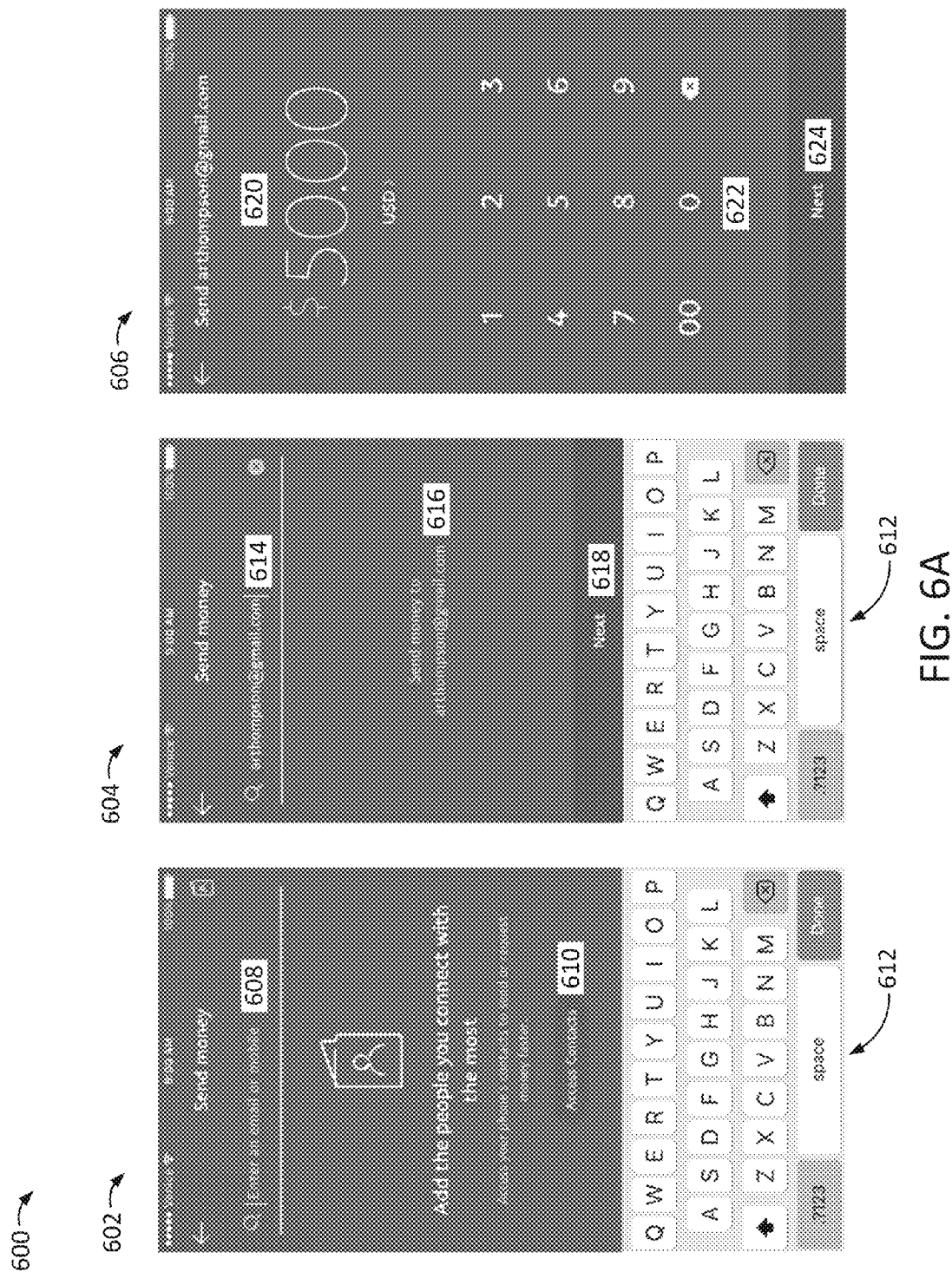
FIG. 6A illustrates an exemplary system with a number of interfaces, according to an embodiment.

FIG. 6A illustrates an exemplary system 600 with a number of interfaces 602, 604, and 606, according to an embodiment. As shown, the system 600 may include various aspects of the mobile systems 200, 300, and/or 400 described above in relation to FIGS. 2A-4B. In particular, each of the interfaces 602, 604, and/or 606 may be provided by the provider application 218 and/or 440 displayed by the mobile systems 200, 300, and/or 400.

As shown, the provider application 440 may display the interface 602 to send money to one or more users. Further, the interface 602 includes an input field 608 to enter an email and/or a phone number with the keyboard 612, possibly an email and/or a phone number associated with the intended receiver of the money. Yet further, the interface 602 includes a button 610 configured to access the contacts of mobile system 600. In addition, the interface 608 illustrates a contact 614 entered with the keyboard 612 in the field 608. As shown, a notification 616 provides that money is being sent to the contact 614, particularly an account associated with the contact 614. Further, the interface 606 indicates an amount 620 indicated with the keyboard 622 and the next button 624. Notably, the font of the amount 620 may be increased based on the various user intents and/or characteristics determined, as described above. For example, the font of the amount 620 may be increased based on the elderly user sending the money to the contact 614.

Figure 6B:
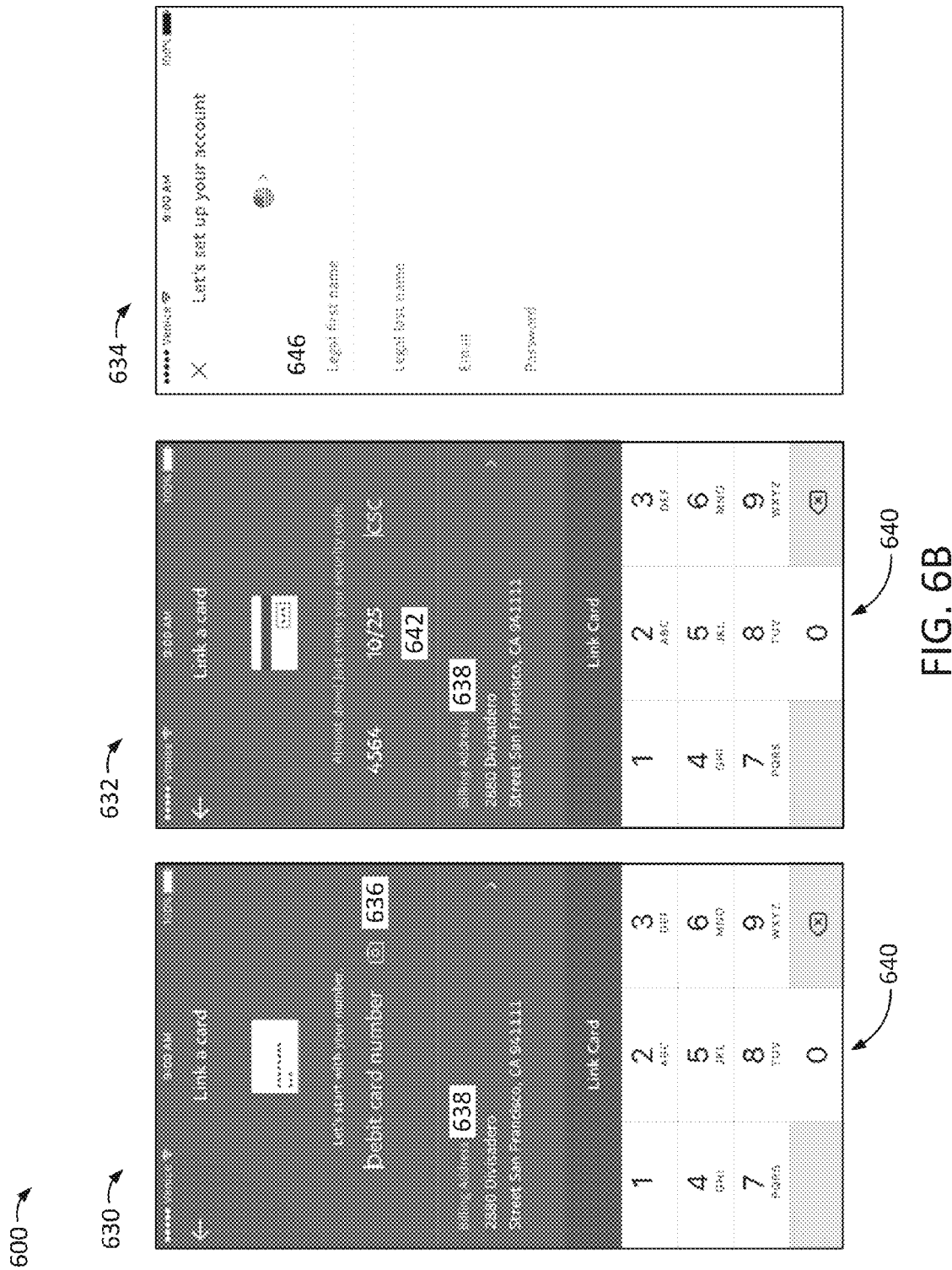
FIG. 6B illustrates an exemplary system with a number of interfaces, according to an embodiment.

FIG. 6B illustrates an exemplary system 600 with a number of interfaces 630, 632, and 634, according to an embodiment. Further, the provider application 400 may display the interface 630 to link the user's card to send the payment described above. As shown, the interface 630 includes an input field 636 to enter a debit card number with the keyboard 640. Yet further, the input field 636 also includes an option to capture an image of the card to enter the debit card number. In addition, the interface 630 includes a billing address 638 to enter a street address, a city, a state, and a zip code. Further, as shown, the interface 632 includes an input field 642 to enter a security code associated with the debit card number with the keyboard 640. Yet further, the interface 634 includes a number of fields 646 to enter a legal first name, last name, email, and/or passwords.

Figure 6C:
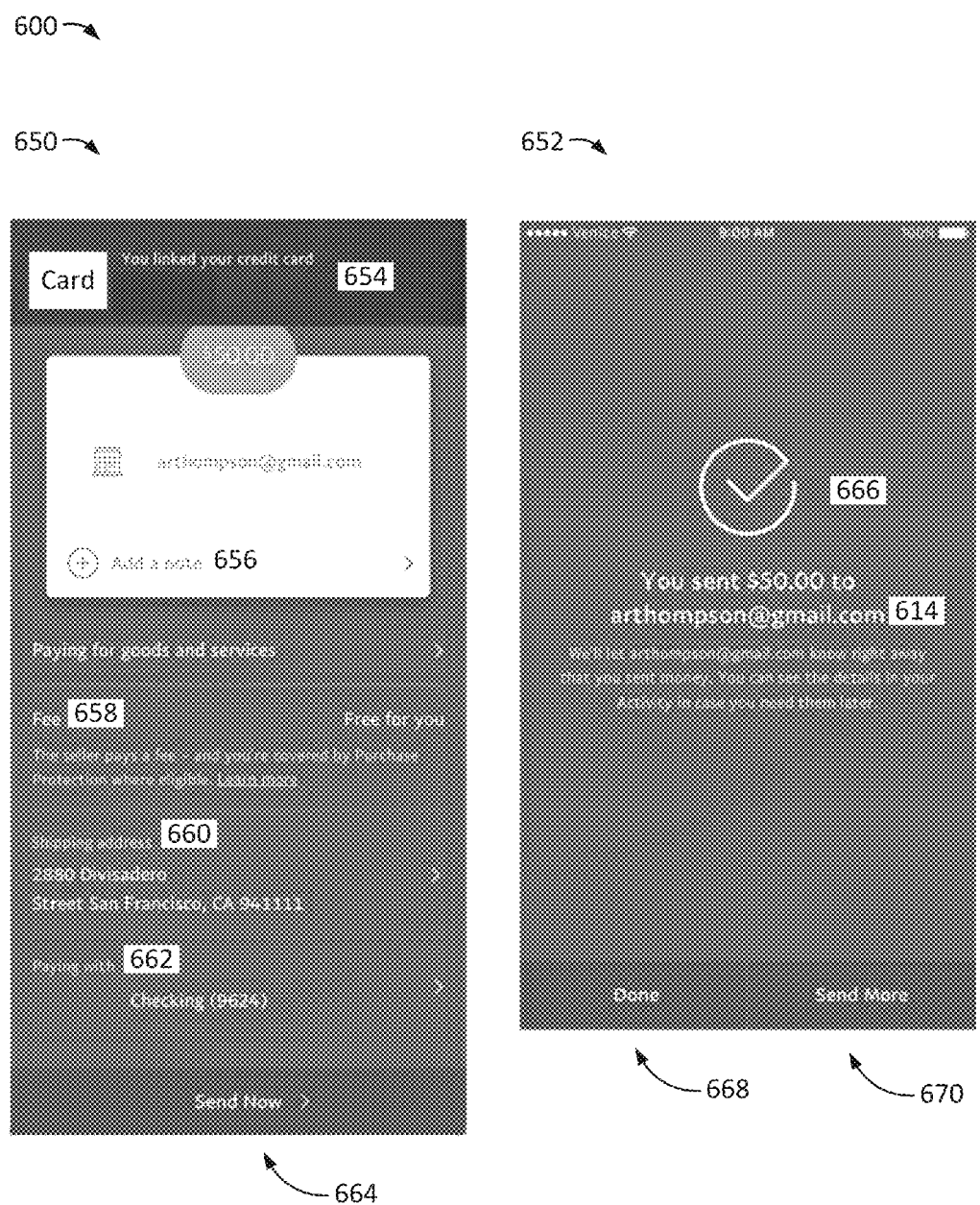
FIG. 6C illustrates an exemplary system with a number of interfaces, according to an embodiment.

FIG. 6C illustrates an exemplary system 600 with a number of interfaces 650 and 652, according to an embodiment. For example, the provider application 440 described above may display the interface 650 to send money with the credit card linked by the notification 654. As shown, the interface 650 includes an input field 656 to add a note with the payment. Further, the notification 658 indicates information regarding a fee, which is shown as being free for this particular user. Yet further, the notification 660 includes the billing address 638 described above. In addition, the notification 662 includes information regarding the payment source as the checking account. As such, the button 664 may be selected to send the money. As shown with the interface 652, the notification 66 indicates that the money is sent to an account of the contact 614. As such, the button 668 may be selected to return to the provider application 400. Yet, the button 670 may be selected to send more money.

In some embodiments, referring back to FIGS. 2D and 2E, the mobile system 200, may determine a total number of mobile applications on the mobile system 200, such as a total number of 10 applications associated with the mobile applications 218, 210-214, 232-236, and 242-246. The system 200 may determine a number of each type of application from the mobile applications 218, 210-214, 232-236, and 242-246. For example, the system 600 may determine two taxi applications (e.g., including the application 210), two airline applications (e.g., including the application 212), and three food ordering applications (e.g., including the application 214), among other types of applications 218, 232,236, and 242-246. The mobile applications 218, 210-214, 232-236, and 242-246 may also include shopping applications, ticketing applications, social applications, messaging applications, and/or hotel applications, among other types of applications. As such, the system 20 may provide and/or display specific content based on the types of applications determined.

The system 200 may also determine respective placement positions of each type of application described above, such as the respective placement positions of the applications 218, 210-214, 232-236, and 242-246 shown in FIGS. 2D and 2E. The system 200 may also determine a usage frequency of the mobile applications 218, 210-214, 232-236, and 242-246, possibly based on each type of application. The system 200 may also determine a recency of updates associated with the mobile applications 218, 210-214, 232-236, and 242-246 from when updates are available. Further, the system 200 may determine the recency of updates based on the usage frequency of the mobile applications. As such, the system 200 may provide specific content on the mobile system 200, as shown above in relation to FIGS. 3A-6C. For example, the system 200 may provide the specific content based on the recency of updates described above.

In some embodiments, the respective placement positions of the mobile application 218, 210-214, 232-236, and 242-246 may be on a first location on the first home screen 230 of the mobile system 200 and a second location on a second home screen 240 of the mobile system 200. In some instances, the usage frequency is determined over a specific time period, such as one or more hours, days, months, and/or years. As such, the specific content may be provided based on the usage frequency determined over such specific time periods. In some instances, the specific content provided on the mobile system 200 includes at least one of onboarding content, font content, language content, checkout content, and/or login content, as shown above in relation to FIGS. 3A-6C. In some instances, the mobile system 200 may determine image content, where the specific content may be provided on the mobile system 200 based on characteristics of the image content. Yet further, the mobile system 200 may determine a frequency of messages transferred (e.g., text messages and/or emails transferred) with the mobile system 200, where the specific content may be provided on the mobile system 200 based on the frequency of message transferred.

In some embodiments, content may be generated with the I/O interface 202 based on the mobile applications 210-214, 218, 232-236, and/or 242-246 installed on the mobile system 200 and particularly, the respective frequencies in which the mobile applications 210-214, 218, 232-236, and/or 242-246 are accessed on the mobile system 200. For example, considering the scenarios above, the elderly user may repeatedly accesses a particular mobile application 210, possibly the blood pressure application described above configured to track and analyze the user's blood pressure. Thus, various contents may be generated and/or displayed with the I/O interface 202 based on the settings and/or fonts of the particular mobile application 210 accessed.

In some embodiments, the mobile system 200 may determine a request to display content on the I/O interface 202 based on an input detected with the I/O interface 202. The mobile system may also identify mobile application data 224, 226, and/or 228 associated with the mobile system 200 based on the determined request. Further, the mobile application data 224, 226, and/or 228 may be associated with a number of the mobile applications 210-214, 232-236, and/or 242-246 installed on the mobile system 200. The mobile system 200 may also determine, based on the mobile application data 224, 226, and/or 228, a respective frequency in which each mobile application 210, 212, and/or 214 is accessed from the number of installed applications 210-214, 232-236, and/or 242-246. The mobile system 200 may generate the requested content based on the respective frequency in which each mobile application 210, 212, and/or 214 is accessed from the number of installed applications 210-214, 232-236, and/or 242-246. The mobile system 200 may also display the generated content on the I/O interface 202.

In some embodiments, the mobile system 200 may determine a particular frequency in which a particular mobile application 210 is accessed from the number of installed applications 210-214, 232-236, and/or 242-246. Further, the particular frequency may be determined to at least meet a threshold frequency. As such, the mobile system 200 may determine one or more contents associated with the particular mobile application 210. In some instances, the one or more determined contents may be associated with a font, a font size, a font color, and/or a font style, among other possibilities. Further, the font style may include a bold font style, an italics font style, and/or an underline font style, among other possibilities. Further, the requested content may be generated based on the one or more determined contents associated with the particular mobile application 210.

In some embodiments, the request to display content may indicate a request to display the content with the mobile application 210 selected from the number of installed applications 210-214, 232-236, and/or 242-246. Further, the mobile system 200 may determine, based on the mobile application data 224, 226, and/or 228, one or more types of the mobile applications 210, 212, and/or 214 from the number of installed applications 210-214, 232-236, and/or 242-246. In some instances, the one or more types of the mobile applications may be determined based on the respective frequencies in which each of the one or more types of the applications mobile applications 210, 212, and/or 214 is accessed. For example, the one or more types of the mobile applications may be determined to include the taxi application type 210 based on the application 210 being accessed frequently during the week. The airline application type 212 may be determined based on the application 212 being accessed once every month. The food-ordering application type 214 may be determined based on the application 214 being accessed more than once a day. The mobile system 200 may also determine the selected mobile application 210 corresponds with the one or more types of mobile applications described above. Further, the requested content may be generated based on the selected mobile application 20 corresponding with the one or more types of mobile applications, such as the taxi application type 210. For example, the content may be generated with larger fonts to enhance readability based on the application 210 being accessed frequently and possibly over short periods of time to call taxi drivers.

In some embodiments, the mobile system 200 may determine, based on the mobile application data 224, 226, and/or 228, respective placement positions of one or more mobile applications 210, 212, and/or 214 from the number of installed applications 210-214, 232-236, and/or 242-246 on the mobile system 200. Further, the requested content may be generated based on the respective placement positions of the one or more mobile applications 210, 212, and/or 214 on the mobile system 200. For example, the position of the application 210 is shown at the top left position in FIG. 2D among the other applications 212, 214, and 232-236. As such the requested content may be generated with font sizes, font styles, colors, layouts, configurations, and/or settings, among other attributes of the mobile application 210.

In some embodiments, the mobile system 200 may utilize media data, such as image data, stored on the mobile system 200 to determine one or more target formats to deliver and/or transmit content, possibly to one or more devices. For example, the mobile system 200 may have stored formatted images (e.g., cropped images, filtered images, brightened images) stored with a mobile application, such as the application 234, possibly a media application. As such, images and/or videos sent with the mobile system 200 may be auto-formatted, possibly with target formats determined from the images stored with the mobile system 200.

In some embodiments, the mobile system 200 may determine a request to deliver content with the mobile system 200 based on an input detected with the mobile system 200, such as with the I/O interface 202. In some instances, the mobile system 200 may identifying media data stored, such as the data 224, 226, and/or 228, with one or more mobile applications 232, 234, and/or 236 installed on the mobile system 200 based on the content requested to be delivered. The mobile system 200 may also determine one or more target formats associated with the content requested to be delivered based on the stored media data described above. The mobile system 200 may also generate the requested content based on the one or more target formats. As such, the mobile system 200 may display the generated content on the interface 202. In some instances, the media data described above may include one or more formatted images. As such, the one or more target formats may be determined based on the one or more formatted images. In some instances, the media data described above with the mobile system 200 may include image data, video data, multimedia data, contact data, text usage data, voice usage data, and/or mobile application usage data, among other possibilities.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

The invention claimed is:

1. A mobile system, comprising:
a non-transitory memory; and
one or more hardware processors coupled to the non-transitory memory and configured to read instructions from the non-transitory memory to cause the mobile system to perform operations comprising:
identifying a request to install a provider application on the mobile system based at least on one or more user inputs received by the mobile system;
determining a plurality of other applications installed on the mobile system;
retrieving, for each particular application in the plurality of other applications, operational data associated with the particular application,
wherein the operational data comprises positional data indicating a relative position of the particular application on a home screen of the mobile system with respect to at least a different application in the plurality of other applications;
determining one or more operational configurations of the provider application based at least on the retrieved operational data associated with the plurality of other applications installed on the mobile system,
wherein the one or more operational configurations comprise one or more parameters for a user interface of the provider application;
installing the provider application on the mobile system based at least on the one or more configurations; and
configuring the provider application to display a user interface element allowing a user to link the provider application with one or more applications in the plurality of other applications based on, at least in part, determining that the one or more applications are accessed at a higher frequency than at least one other application in the plurality of other applications.

2. The mobile system of claim 1, wherein the operational data associated with the plurality of other applications further comprises data indicating one or more languages associated with content provided by the plurality of other applications on the mobile system, and wherein installing the provider application on the mobile system based at least on one of the one or more configurations comprises configuring the provider application to present data in the one or more languages in the user interface.

3. The mobile system of claim 1, wherein the operations further comprise:
   displaying an inquiry associated with installing the provider application; and
   retrieving a response to the inquiry based at least on a second user input received by the mobile system,
   wherein the one or more operational configurations of the provider application is determined based at least on the response retrieved.

4. The mobile system of claim 1, wherein the mobile system is configured to display, non-contemporarily, a first home screen and a second home screen on a display of the mobile system, wherein the operational data further comprises data indicating a particular display home screen, from the first home screen and the second home screen, on which each of the plurality of other applications is displayed, and
   wherein the one or more operational configurations of the provider application is determined based at least on the particular display home screen on which each of the plurality of other applications is displayed.

5. The mobile system of claim 1, wherein the operational data further comprises data indicating one or more types of content accessed by the plurality of other applications installed on the mobile system, wherein the one or more types of content accessed comprises merchandise content, and
   wherein the one or more operational configurations of the provider application is determined based at least on the one or more types of content.

6. The mobile system of claim 1, wherein the operations further comprise:
   determining a frequency in which each application of the plurality of other applications is accessed based on the retrieved positional data,
   wherein the one or more operational configurations of the provider application is determined based at least on the frequency in which each application of the plurality of other applications is accessed.

7. The mobile system of claim 1, wherein the operations further comprise:
   determining a time associated with installing the provider application; and
   determining one or more applications from the plurality of other applications accessed in a time period from the time associated with installing the provider,
   wherein the one or more operational configurations of the provider application is determined based at least on the one or more applications accessed in the time period.

8. A non-transitory machine-readable medium having stored thereon machine-readable instructions executable to cause a machine to perform operations comprising:
   identifying a request to activate a provider application on a mobile device based at least on one or more inputs received by the mobile device;
   determining a plurality of other applications installed on the mobile device;
   retrieving, for each particular application in the plurality of other applications, operational data associated with the particular application,
   wherein the operational data comprises positional data indicating a relative position of the particular application on a home screen of the mobile system with respect to at least a different application in the plurality of other applications;
   determining one or more operational configurations of the provider application based at least on the retrieved operational data associated with the plurality of other applications installed on the mobile device,
   wherein the one or more operational configurations comprise one or more parameters for a user interface of the provider application;
   activating the provider application on the mobile device based at least on the one or more configurations; and
   configuring the provider application to display a user interface element allowing a user to link the provider application with one or more applications in the plurality of other applications based on, at least in part, determining that the one or more applications are accessed at a higher frequency than at least one other application in the plurality of other applications.

9. The non-transitory machine-readable medium of claim 8, wherein the operations further comprise:
   determining one or more location settings associated with the mobile device that enables the mobile device to determine one or more locations of the mobile device,
   wherein the one or more determined operational configurations of the provider application comprises a configuration of the provider application to receive one or more offers based at least on the one or more locations of the mobile device, and
   wherein the provider application of the mobile device is activated based at least on the configuration of the provider application to receive the one or more offers.

10. The non-transitory machine-readable medium of claim 8, wherein the operational data further comprises data indicating one or more notification settings of the mobile device that causes the mobile device to display one or more notifications associated with the plurality of other applications installed on the mobile device,
    wherein the one or more determined operational configurations of the provider application comprises a configuration of the provider application to receive the one or more notifications associated with the plurality of other applications, and
    wherein the provider application is activated to provide the one or more notifications based at least on the configuration of the provider application to receive the one or more notifications.

11. The non-transitory machine-readable medium of claim 8, wherein the operational data associated with the plurality of other applications further comprises data indicating one or more font settings associated with first content provided by the plurality of other applications installed on the mobile device, wherein activating the provider application comprises configuring the provider application with the one or more font settings determined, and wherein the provider application activated causes the mobile device to display second content on the user interface based at least on the one or more font settings determined.

12. The non-transitory machine-readable medium of claim 8, wherein the operations further comprise:

determining at least one of an airline application and/or a taxi application activated from the plurality of other applications installed on the mobile device, wherein the one or more operational configurations of the provider application is determined based on at least one of the airline application and/or the taxi application activated.

13. The non-transitory machine-readable medium of claim 8, wherein the operations further comprise:

determining a fund transfer application activated from the plurality of other applications installed on the mobile device; and determining one or more user intents associated with the provider application comprises a user intent to transfer funds with one or more user accounts based at least on the fund transfer application activated, wherein the one or more operational configurations of the provider application on the mobile device is determined based at least on the intent to transfer funds with the one or more user accounts.

14. The non-transitory machine-readable medium of claim 8, wherein the operations further comprise:

determining a food ordering application activated from the plurality of other applications installed on the mobile device, wherein the one or more operational configurations of the provider application are determined based at least on the food ordering application activated.

15. A method for configuring a provider application, comprising:

identifying a request to install the provider application on a mobile device based at least on one or more user inputs received by the mobile device;

determining a plurality of other applications installed on the mobile device;

retrieving, for each particular application in the plurality of other applications, operational data associated with the particular application, wherein the operational data comprises positional data indicating a relative position of the particular application on a home screen of the mobile system with respect to at least a different application in the plurality of other applications;

determining one or more operational configurations of the provider application based at least on the retrieved operational data associated with the plurality of other applications installed on the mobile device, wherein the one or more operational configurations comprise one or more parameters for a user interface of the provider application;

installing the provider application on the mobile device based at least on the one or more configurations; and configuring the provider application to display a user interface element allowing a user to link the provider application with one or more applications in the plurality of other applications based on, at least in part, determining that the one or more applications are accessed at a higher frequency than at least one other application in the plurality of other applications.

16. The method of claim 15, wherein the operational data associated with the plurality of other applications comprises data indicating one or more languages associated with content provided by the plurality of other applications on the mobile device, and wherein installing the provider application on the mobile device based at least on one of the one or more configurations comprises configuring the provider application to display data in the one or more languages on the user interface.

17. The method of claim 15, further comprising:

displaying a plurality of inquiries associated with installing the provider application; and retrieving responses to the plurality of inquiries based at least on second user inputs received by the mobile device, wherein the one or more operational configurations of the provider application is determined based at least on the responses retrieved.

18. The method of claim 15, wherein the operational data further comprises data indicating one or more types of content accessed by the plurality of other applications installed on the mobile device, wherein the one or more types of content accessed comprises merchandise content, and wherein the one or more operational configurations of the provider application is determined based at least on the one or more types of content.

19. The method of claim 15, further comprising:

determining a frequency in which each application of the plurality of other applications is accessed based on the positional data, wherein the one or more operational configurations of the provider application is determined based at least on the frequency in which each application of the plurality of other applications is accessed.

* * * * *